US011241994B2

(12) United States Patent
Pollon

(10) Patent No.: US 11,241,994 B2
(45) Date of Patent: Feb. 8, 2022

(54) EXPANDABLE VEHICLE

(71) Applicant: Joseph Lee Pollon, Arroyo Grande (CA)

(72) Inventor: Joseph Lee Pollon, Arroyo Grande (CA)

(*) Notice: Subject to any disclaimer, the term of this patent is extended or adjusted under 35 U.S.C. 154(b) by 0 days.

(21) Appl. No.: 16/850,001

(22) Filed: Apr. 16, 2020

(65) Prior Publication Data
US 2021/0107392 A1 Apr. 15, 2021

Related U.S. Application Data

(60) Provisional application No. 62/913,494, filed on Oct. 10, 2019.

(51) Int. Cl.
*B60J 7/00* (2006.01)
*B60P 3/34* (2006.01)

(52) U.S. Cl.
CPC ........... *B60P 3/34* (2013.01); *B60Y 2200/147* (2013.01)

(58) Field of Classification Search
CPC ....... B60P 3/34; A61B 17/29; A61B 17/7044; B65H 2511/22; A21B 1/48; A61F 2/2418; A61F 2220/0016; A61F 2220/0075; A61F 2250/0003; A61F 2/2436
See application file for complete search history.

(56) References Cited

U.S. PATENT DOCUMENTS

| | | |
|---|---|---|
| 2,901,282 A | 8/1959 | Meaker |
| 2,965,412 A | 12/1960 | Henderson et al. |
| 4,047,630 A | 9/1977 | Young |
| 4,092,039 A | 5/1978 | Lutkenhouse |
| 4,128,269 A | 12/1978 | Stewart |
| 4,132,444 A | 1/1979 | Beggs |
| 4,206,943 A | 6/1980 | Friedenberg |
| 4,223,939 A | 9/1980 | Beggs |
| 4,253,283 A | 5/1981 | May |
| 4,312,159 A * | 1/1982 | Paul ...................... E04B 1/3431 52/67 |
| 4,488,752 A | 12/1984 | Broussard |
| 4,504,049 A | 3/1985 | Straub |
| 4,539,722 A | 9/1985 | Broussard |
| 4,598,510 A | 7/1986 | Wagner, III |
| 4,772,038 A | 9/1988 | MacDonald |
| 4,784,429 A | 11/1988 | Hodges |
| D300,012 S | 2/1989 | Boice, Jr. |
| 4,955,661 A | 9/1990 | Mattice |
| 5,090,749 A | 2/1992 | Lee |
| 5,118,245 A | 6/1992 | Dunkel |

(Continued)

*Primary Examiner* — Kiran B Patel

(74) *Attorney, Agent, or Firm* — Stephen Knauer, Esq.

(57) ABSTRACT

An expandable vehicle comprising a vehicle chassis and an expandable structure that is fixed to, carried by, and supported by the vehicle chassis. The expandable structure is expanded when the expandable vehicle is stationary for the stationary purpose of the expandable vehicle and is contracted when the expandable vehicle is being moved. The expandable structure comprises an expandable frame and an expandable body. The expandable body is fixed to, carried by, and supported by the expandable frame while the expandable frame is fixed to, carried by, and supported by the vehicle chassis. As the expandable frame is expanded and contracted, the expandable body is correspondingly expanded and contracted.

41 Claims, 12 Drawing Sheets

(56) References Cited

U.S. PATENT DOCUMENTS

| | | | | |
|---|---|---|---|---|
| 5,154,469 | A | 10/1992 | Morrow | |
| 5,186,596 | A | 2/1993 | Boucher et al. | |
| 5,237,782 | A * | 8/1993 | Cooper | B60P 3/34 296/171 |
| 5,275,064 | A | 1/1994 | Hobbs | |
| 5,280,985 | A | 1/1994 | Morris | |
| 5,560,444 | A | 10/1996 | Tiedge | |
| 5,706,612 | A * | 1/1998 | Tillett | B60P 3/34 296/171 |
| 5,727,805 | A | 3/1998 | La Roque | |
| 5,758,918 | A | 6/1998 | Schneider et al. | |
| 5,800,002 | A | 9/1998 | Tiedge et al. | |
| 5,833,296 | A | 11/1998 | Schneider | |
| 5,860,686 | A | 1/1999 | Tiedge | |
| 5,902,001 | A * | 5/1999 | Schneider | B60P 3/34 296/26.13 |
| 5,915,774 | A | 6/1999 | Tiedge | |
| 6,003,919 | A | 12/1999 | Shook | |
| 6,108,983 | A * | 8/2000 | Dewald, Jr. | B60P 3/34 296/171 |
| 6,196,604 | B1 | 3/2001 | Hoh et al. | |
| 6,293,611 | B1 * | 9/2001 | Schneider | B60P 3/34 296/165 |
| 6,302,475 | B1 | 10/2001 | Anderson | |
| 6,422,628 | B1 | 7/2002 | Bortell | |
| 6,658,798 | B1 * | 12/2003 | Frerichs | B60P 3/34 296/171 |
| 6,691,361 | B2 | 2/2004 | Rolfe et al. | |
| 6,739,617 | B1 | 5/2004 | Martin | |
| 6,746,040 | B2 | 6/2004 | Bordeleau et al. | |
| 6,783,164 | B2 | 8/2004 | Bortell | |
| 6,937,692 | B2 | 8/2005 | Johnson et al. | |
| 7,066,528 | B1 * | 6/2006 | Crean | B60P 3/34 296/165 |
| 7,163,207 | B2 | 1/2007 | Baird et al. | |
| 7,229,123 | B2 | 6/2007 | Kunz | |
| 7,261,354 | B1 | 8/2007 | Lozano | |
| 7,397,891 | B2 | 7/2008 | Johnson et al. | |
| 7,712,813 | B2 | 5/2010 | Di Franco | |
| 7,731,256 | B1 * | 6/2010 | Wivinis | B60P 3/34 296/26.01 |
| D623,990 | S | 9/2010 | Yumru | |
| D626,035 | S | 10/2010 | Yumru | |
| 7,810,834 | B2 | 10/2010 | Schneider et al. | |
| 8,141,683 | B1 | 3/2012 | Wurth et al. | |
| 8,267,455 | B1 | 9/2012 | Ludwick | |
| 8,555,558 | B1 | 10/2013 | Trout et al. | |
| 8,844,212 | B1 | 9/2014 | Trout et al. | |
| 8,910,989 | B1 | 12/2014 | Boltz | |
| 8,944,456 | B2 | 2/2015 | Tsukerman et al. | |
| 9,096,179 | B2 | 8/2015 | Reiseder | |
| 9,333,820 | B2 | 5/2016 | Anabtawi et al. | |
| 9,834,127 | B2 | 12/2017 | Caulder | |
| 9,849,927 | B2 | 12/2017 | Haefele | |
| 10,124,845 | B1 | 11/2018 | Boltz | |
| 10,232,882 | B2 | 3/2019 | Bertezzolo | |
| 2002/0180232 | A1 | 12/2002 | Schneider et al. | |
| 2005/0179277 | A1 * | 8/2005 | Schneider | B60P 3/34 296/26.01 |
| 2006/0145499 | A1 * | 7/2006 | Boon | B60P 3/34 296/26.14 |
| 2006/0254159 | A1 * | 11/2006 | Trautman | E04B 1/3444 52/64 |
| 2008/0164720 | A1 * | 7/2008 | Crean | B60P 3/34 296/165 |
| 2008/0258497 | A1 * | 10/2008 | Oliver | B60R 15/00 296/168 |
| 2009/0261610 | A1 * | 10/2009 | Kreil | B60P 3/34 296/26.13 |
| 2010/0066025 | A1 * | 3/2010 | Kreil | B60P 3/34 277/315 |
| 2012/0261944 | A1 * | 10/2012 | Kreil | F16J 15/3296 296/175 |
| 2013/0305627 | A1 * | 11/2013 | Pike | B60P 3/34 52/79.5 |
| 2016/0325671 | A1 * | 11/2016 | White | A47B 45/00 |
| 2017/0028898 | A1 * | 2/2017 | Garceau | F16H 35/18 |
| 2019/0241113 | A1 | 8/2019 | Garceau | B60P 3/34 |
| 2020/0317111 | A1 * | 10/2020 | Mundt | B60P 3/34 |
| 2020/0317143 | A1 * | 10/2020 | Goode | B62D 21/14 |
| 2020/0325968 | A1 * | 10/2020 | Carlson | F16H 25/2015 |
| 2021/0178954 | A1 * | 6/2021 | Reid | B60P 1/027 |

* cited by examiner

EXPANDABLE VEHICLE

CLAIM OF PRIORITY AND CROSS REFERENCE TO RELATED DOCUMENTS

This U.S. non-provisional patent application claims the benefit of U.S. provisional patent application Ser. No. 62/913,494, filed Oct. 10, 2019, titled Expandable Tiny House and Expandable Trailer Therefor, and is hereby incorporated by reference herein.

TECHNICAL FIELD

The present invention related to expandable mobile homes and expandable platforms for such homes.

BACKGROUND OF INVENTION

Expandable vehicles, such as expandable tiny house trailers, expandable mobile home trailers, expandable recreational vehicle trailers, expandable motorhomes (i.e., motorized recreational vehicles), expandable house truck or trailers, expandable camper truck or trailers, expandable campervans, have become very popular. Such an expandable vehicle has an expandable structure with an interior volume and/or area that is fully or partially enclosed by the expandable structure. When the expandable vehicle is stationary, the expandable structure is expanded to increase its interior volume and/or area for the stationary purpose of the expandable vehicle. And, when the expandable vehicle is being moved, the expandable structure is contracted to reduce its interior volume and/or area so that the expandable vehicle can be safely and legally moved. Numerous efforts have been made in the past to implement such an expandable vehicle. But, as described below these efforts have suffered from various issues that limit their effectiveness and desirability.

Some efforts have focused on expandable recreational vehicles that have expandable living space structures (e.g., living rooms, bedrooms, bathrooms, and any combinations thereof) with slide out sections. The slide out section is extended out from the expandable living space structure on one side of the expandable recreational vehicle when the expandable recreational vehicle is stationary and is retracted back within the expandable living space structure when the expandable recreational vehicle is being transported. However, since the slide out section is typically rather small and is only extended from one side of the expandable recreational vehicle, it still does not significantly expand the interior volume and/or area of the expandable living space structure when extended.

Other efforts have been directed to expandable tiny house trailers. Similar to expandable recreational vehicles, these expandable tiny house trailers have expandable living space structures with extendable rooms. Similar to the slide out section of an expandable recreational vehicle, the extendable room is extended out from within a main room of the expandable living space structure of the tiny house trailer when the expandable tiny house trailer is stationary and is retracted back within the main room when the expandable tiny house trailer is being transported. However, since the extendable room is often fairly large and extends out from within the main room in just one direction, the expansion of the expandable tiny house trailer is difficult to implement because the expandable tiny house trailer becomes unbalanced and unstable.

Still other efforts have addressed the use of expandable house trailers with expandable living space structures having smaller and larger extendable sections that oppose and overlap each other. When the expandable house trailer is stationary, the smaller extendable section is extended out from within the interior of the larger extendable section while the larger extendable section is expanded out from around the exterior of the smaller extendable section. And, when the expandable house trailer is being moved, the smaller extendable section is retracted back into the interior of the larger extendable section as the larger extendable section is retracted back around the exterior of the smaller extendable section. However, the extendable sections are expanded and retracted independently of each other using separate components to do so. While effective in significantly increasing the interior volume and/or area of the expandable living space structure, this is rather complicated and inefficient to implement since each extendable section must be expanded and retracted independently without sharing or cooperating (i.e., collaborating) with the components used to expand and retract the other extendable section.

Thus, there exists a need for an expandable vehicle with an expandable structure that has a significantly increased interior volume and/or area when expanded, is easy to expand and contract, and is simple and efficient to construct. The invention described herein fulfills this need.

DETAILED DESCRIPTION OF INVENTION

Introduction

The invention presented herein is described in the context of example embodiments of an expandable vehicle and its various components. The characteristics and advantages of the example embodiments will become apparent in view of the following description of those embodiments with reference to the accompanying figures.

Overview of Expandable Vehicle 100

Referring to FIGS. 1A to 2B, in various embodiments, the expandable vehicle 100 comprises a vehicle chassis 101 and an expandable structure 102 that is fixed to, carried by, and supported by the vehicle chassis 101. The expandable structure 102 is expanded when the expandable vehicle 100 is stationary for the stationary purpose of the expandable vehicle 100 and is contracted when the expandable vehicle 100 is being moved so that the expandable vehicle 100 can be safely and legally moved. The expandable structure 102 is shown in its expanded state in FIGS. 1A and 2A and in its contracted state in FIGS. 1B and 2B.

Figure 1A:
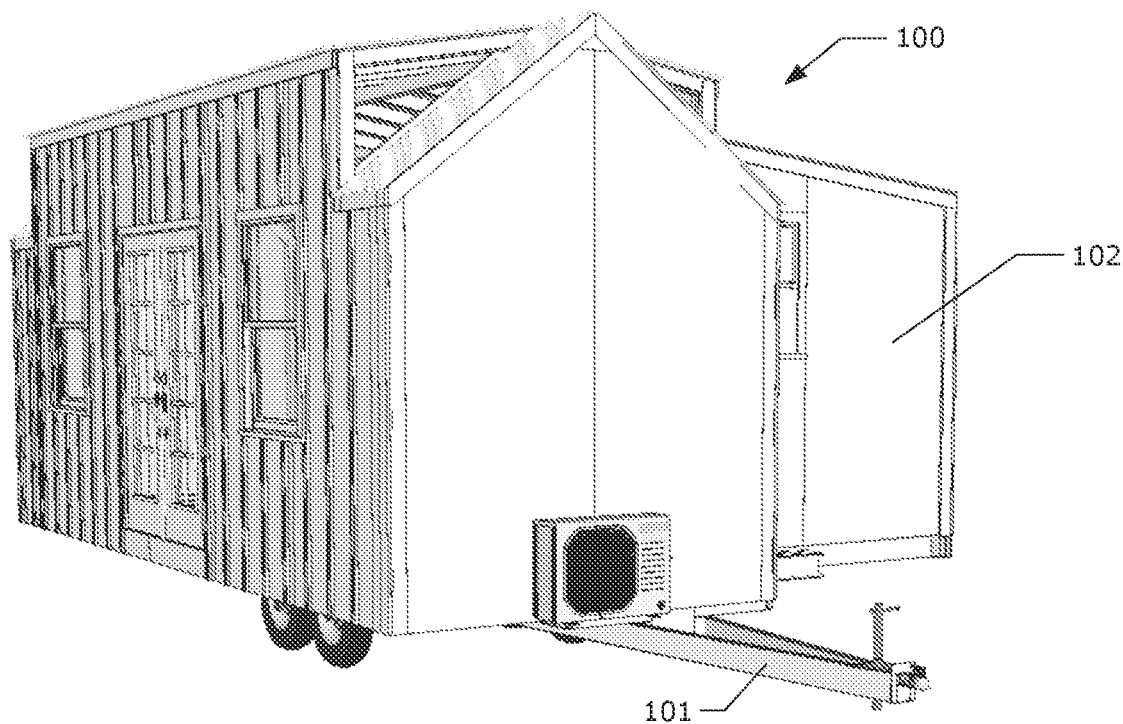
FIG. 1A shows a perspective exterior view of an expandable vehicle with an expandable structure in its expanded state.
Figure 1B:
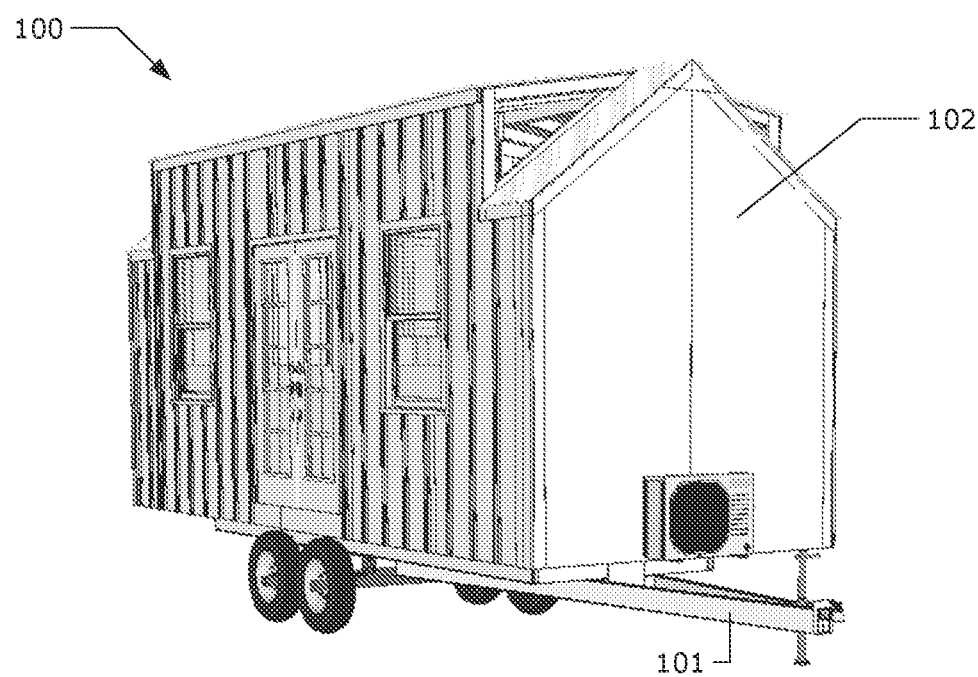
FIG. 1B shows a perspective exterior view of the expandable vehicle with the expandable structure in its contracted state.
Figure 2A:
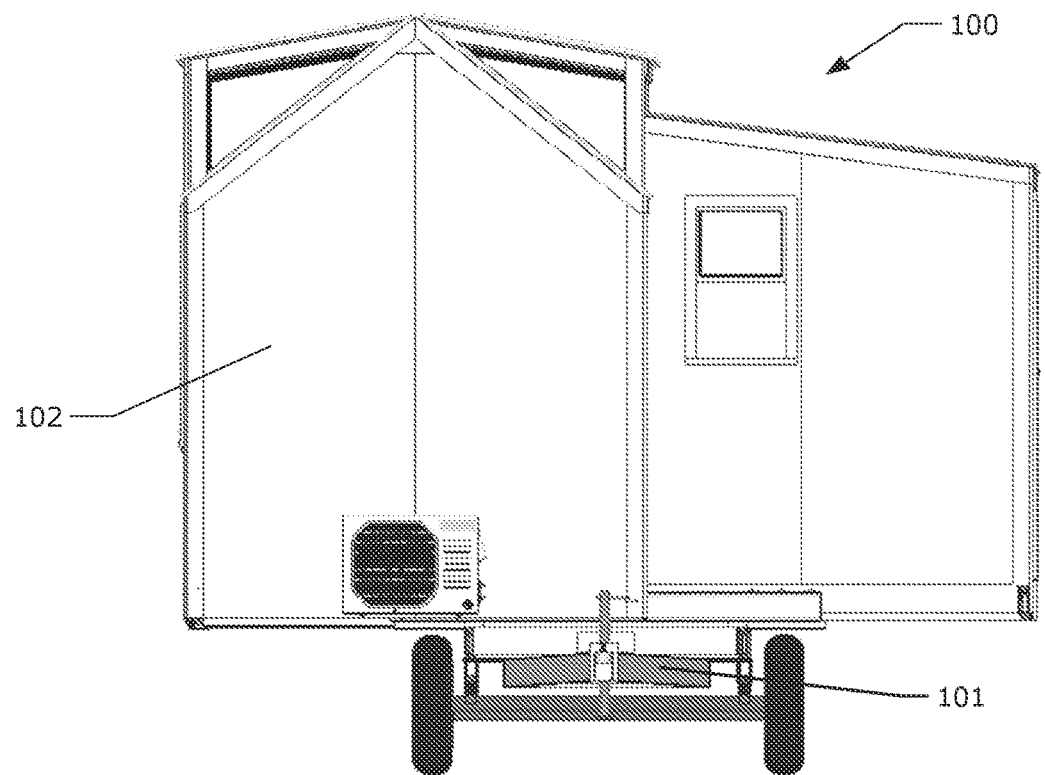
FIG. 2A shows a front exterior view of the expandable vehicle with the expandable structure in its expanded state.
Figure 2B:
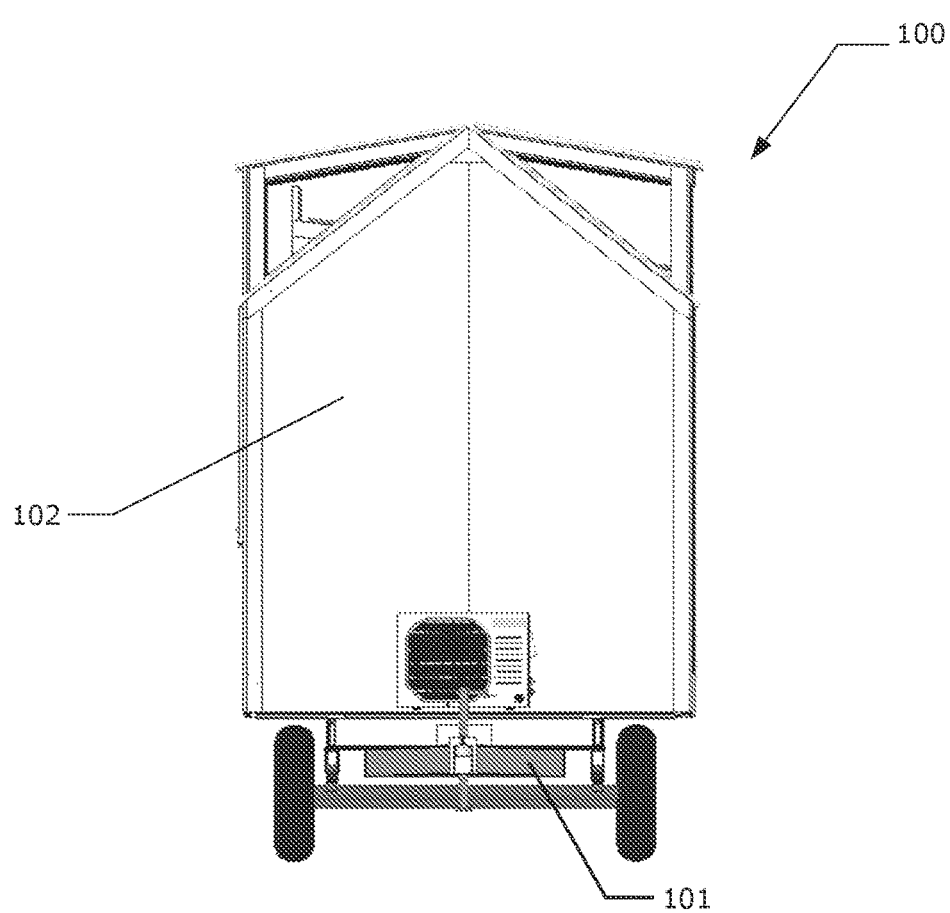
FIG. 2B shows a front exterior view of the expandable vehicle with the expandable structure in its contracted state.
Figure 3A:
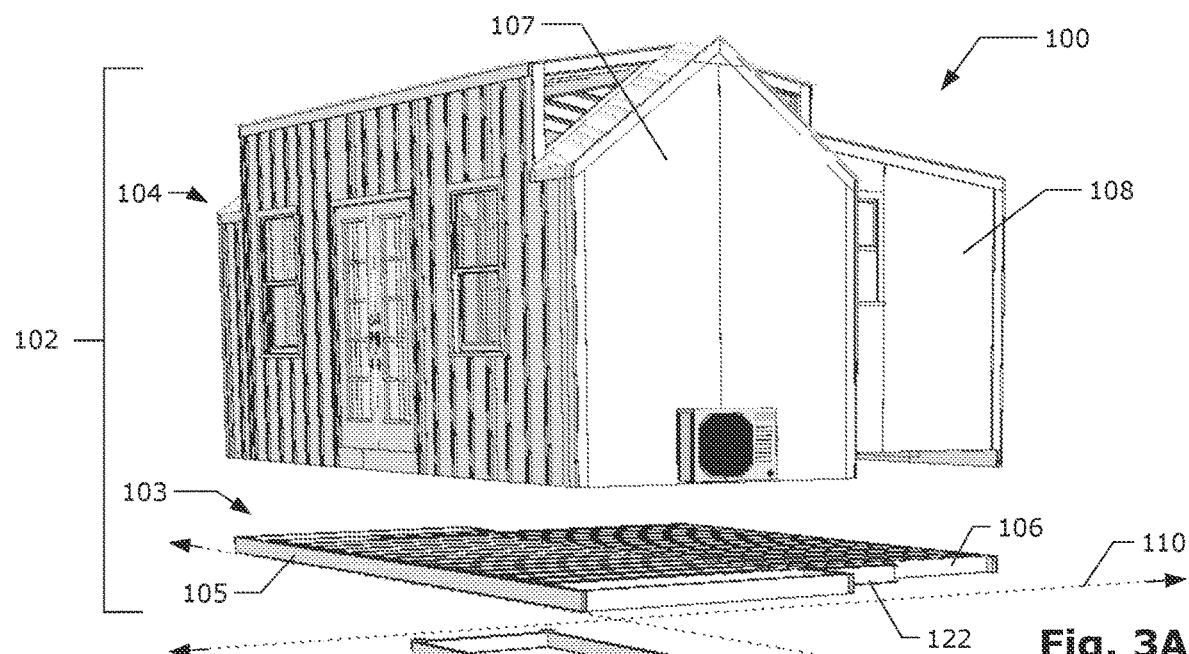
FIG. 3A shows a perspective exploded exterior view of the expandable vehicle with the expandable structure in its expanded state.
Figure 3B:
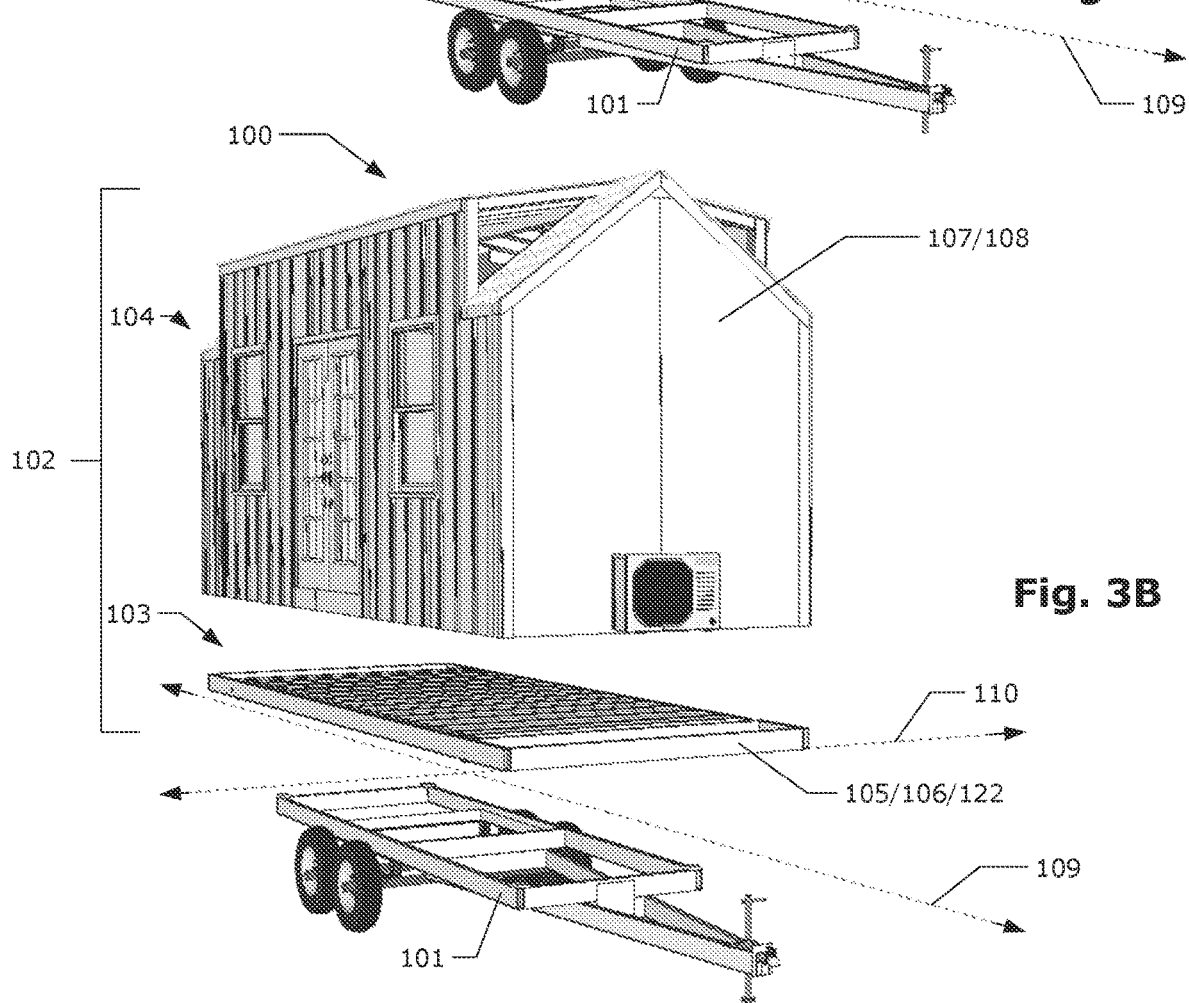
FIG. 3B shows a perspective exploded exterior view of the expandable vehicle with the expandable structure in its contracted state.

Turning to FIGS. 3A and 3B, the expandable structure 102 comprises an expandable frame 103 and an expandable body 104. The expandable body 104 is fixed to, carried by, and supported by the expandable frame 103 while the expandable frame 103 is fixed to, carried by, and supported by the vehicle chassis 101. Thus, the entire expandable structure 102 is fixed to, carried by, and supported by the vehicle chassis 101.

The vehicle chassis 101 defines a longitudinal axis 109 running along the centerline horizontal length of the vehicle chassis 101 and a lateral axis 110 running along the centerline horizontal width of the vehicle chassis 101. The longitudinal axis 109 and the lateral axis 110 are perpendicular to each other. The horizontal lengths of the expandable frame 103 and the expandable body 104 are aligned parallel to the longitudinal axis 109 while their horizontal widths are aligned parallel to the lateral axis 110.

When the expandable structure 102 is in its expanded state, as shown in FIG. 3A, the expandable frame 103 and the expandable body 104 are correspondingly in their expanded states. In this case, the support area of the expandable frame 103 and the interior volume and/or area of the expandable body 104 have been expanded for the stationary purpose of the expandable vehicle 100. Conversely, when the expandable structure 102 is in its contacted state, as shown in FIG. 3B, the expandable frame 103 and the expandable body 104 are correspondingly in their contracted states. Here, the expandable support area of the expandable frame 103 and the interior volume and/or area of the expandable body 104 have been contracted so that the expandable vehicle 100 can be safely and legally moved.

The expandable frame 103 comprises opposing extendable (or rollout) frame sections 105 and 106. The extendable frame sections 105 and 106 together define the support area of the expandable frame 103. As will be described shortly, the extendable frame sections 105 and 106 rollably and opposingly intersect (i.e., overlap) to define this support area.

The extendable frame sections 105 and 106 are aligned parallel to and on opposite sides of the longitudinal axis 109 and perpendicular to the lateral axis 110. More specifically, the horizontal lengths of the extendable frame sections 105 and 106 are aligned parallel to and on opposite sides of the longitudinal axis 109 while their horizontal widths are aligned parallel to the lateral axis 110. As will be described in greater detail later, the extendable frame sections 105 and 106 can be opposingly, independently, and rollably extended out away from each other and retracted in toward each other in opposite directions parallel to the lateral axis 110 and perpendicular to the longitudinal axis 109.

The expandable frame 103 further comprises opposing anchor structures 122 fixed to the vehicle chassis 101. The anchor structures 122 are parallelly spaced apart from each other and aligned parallel to and on opposite sides of the lateral axis 110 and perpendicular to the longitudinal axis 109 so as to oppose each other. As will be described in greater detail later, the anchor structures 122 are shared by the extendable frame sections 105 and 106 so as to opposingly, independently, and rollably anchor the extendable frame sections 105 and 106 as the extendable frame sections 105 and 106 are opposingly, independently, and rollably extended and retracted.

The extendable frame sections 105 and 106 rollably oppose and intersect (i.e., overlap) each other parallel to the lateral axis 110 and on opposite sides of the longitudinal axis 109. They do so by simply and efficiently sharing the anchor structures 122 and other intersecting and cooperating (i.e., collaborating) components, as will be described in more detail later. This, as will also be described in greater detail later, enables the extendable frame sections 105 and 106 to be opposingly, independently, and rollably extended and retracted while maintaining the balance and stability of the expandable vehicle 100 as it is being expanded and contracted.

FIG. 3A shows the extendable frame sections 105 and 106 in their extended positions for the expanded states of the expandable frame 103, the expandable body 104, and the expandable structure 102. Here, the extendable frame sections 105 and 106 are opposingly, independently, and rollably extended out away from each other in opposite directions parallel to the lateral axis 110 and perpendicular to the longitudinal axis 109 to bring them to their extended positions. As a result, there is a relatively small intersection between the frame sections 105 and 106 and the support area of the expandable frame 103 is expanded.

In contrast, FIG. 3B shows the extendable frame sections 105 and 106 in their retracted positions for the contracted states of the expandable frame 103, the expandable body 104, and the expandable structure 102. In this case, the extendable frame sections 105 and 106 are opposingly, independently, and rollably retracted in toward each other in opposite directions parallel to the lateral axis 110 and perpendicular to the longitudinal axis 109 to bring them to their retracted positions. Consequently, the support area of the expandable frame 103 is contracted since there is a relatively large intersection between the extendable frame sections 105 and 106.

Referring again to FIGS. 3A and 3B, the expandable body 104 comprises opposing extendable body sections 107 and 108 that define the interior volume and/or area of the expandable body 104. The extendable body sections 107 and 108 are respectively fixed to, carried by, and supported by the extendable frame sections 105 and 106 via the support area of the extendable frame sections 105 and 106. As will be described shortly, the extendable body sections 107 and 108 rollably and opposingly overlap to define this interior volume and/or area as correspondingly the extendable frame sections 105 and 106 rollably and opposingly intersect to define the support area of the expandable frame 103. This overlap occurs between the interior of the extendable body section 107 and the exterior of the extendable body section 108 since the extendable body section 107 is larger and has a larger volume and/or area.

Like the extendable frame sections 105 and 106, the extendable body sections 107 and 108 are correspondingly aligned parallel to and on opposite sides of the longitudinal axis 109 and perpendicular to the lateral axis 110. More specifically, and further like the extendable frame sections 105 and 106, the horizontal lengths of the extendable body sections 107 and 108 are aligned parallel to the longitudinal axis 109 while their horizontal widths are aligned parallel to the lateral axis 110.

The extendable body sections 107 and 108 also rollably oppose and overlap each other parallel to the lateral axis 110 and on opposite sides of the longitudinal axis 109 because the frame sections 105 and 106 that carry them rollably oppose and intersect each other in a corresponding manner. Therefore, as will also be described in greater detail later and like the extendable frame sections 105 and 106, the extendable body sections 107 and 108 can be opposingly, independently, and rollably extended out away from each other and retracted in toward each other in opposite directions parallel to the lateral axis 110 and perpendicular to the longitudinal axis 109 while maintaining the balance and stability of the expandable vehicle 100 as it is being expanded and contracted.

FIG. 3A shows the extendable body sections 107 and 108 in their extended positions for the expanded states of the expandable frame 103, the expandable body 104, and the expandable structure 102. Like the extendable frame sections 105 and 106 that they are fixed to, carried by, and supported by, the extendable body sections 107 and 108 are opposingly, independently, and rollably extended out away from each other in opposite directions parallel to the lateral axis 110 and perpendicular to the longitudinal axis 109 to bring them to their extended positions. In doing so, the exterior of the body section 107 and the interior of the body section 108 are latched and sealed together and there is a relatively small overlap between them. As a result, the interior volume and/or area of the expandable body 104 is expanded.

In contrast, FIG. 3B shows the extendable body sections 107 and 108 in their retracted positions for the retracted states of the expandable frame 103, the expandable body 104, and the expandable structure 102. As with the extendable frame sections 105 and 106 that they are fixed to, carried by, and supported by, the extendable body sections 107 and 108 are opposingly, independently, and rollably retracted in toward each other in opposite directions parallel to the lateral axis 110 and perpendicular to the longitudinal axis 109 to bring them to their retracted positions. As a result, the exterior of the body section 107 and the interior of the body section 108 are not latched and sealed together and there is a relatively large overlap between them. Thus, the interior volume and/or area of the expandable body 104 is contracted.

In various embodiments, the expandable vehicle 100 may be an expandable trailer, as is shown in FIGS. 1A to 3B. In these embodiments, the vehicle chassis 101 is a trailer chassis and the expandable structure 102 is an expandable trailer structure, such as such as expandable living space structure, expandable workspace structure, expandable cargo space structure, expandable storage space structure, or expandable flatbed structure.

In other embodiments, the expandable vehicle 100 may be an expandable motor vehicle. In these embodiments, the vehicle chassis 101 is a motorized chassis and the expandable structure 102 is an expandable motor vehicle structure, such as expandable living space structure, expandable workspace structure, expandable cargo space structure, expandable storage space structure, or expandable flatbed structure. Such an expandable motor vehicle may also include a non-expandable motor vehicle structure, such as a driver cabin structure, fixed to, carried by, and supported by the motorized chassis.

Furthermore, in some embodiments, the expandable vehicle 100 may be an expandable tiny house trailer, expandable mobile home trailer, expandable recreational vehicle trailer, expandable motorhome (i.e., motorized recreational vehicle), expandable house truck or trailer, expandable camper truck or trailer, expandable campervan, etc., where the stationary purpose of such vehicles is to provide living space. In these embodiments, the vehicle chassis 101 may be a motorized or trailer chassis, the expandable structure 102 may be an expandable living space structure and the expandable body 104 may be an expandable living space body. In this case, the extendable sections 107 and 108 of the expandable body 104 may comprise living space sections that could each comprise various combinations of one or more of a living room, a bedroom, a kitchen, an office, a study, a dining room, etc.

In fact, in the embodiments specifically shown in the FIGS. 1A to 3B, the expandable vehicle 100 is an expandable tiny house trailer where the stationary purpose of the tiny house trailer is to provide living space. In this embodiment, as is also specifically shown in the FIGS. 1A to 3B, the vehicle chassis 101 is a tiny house trailer chassis, the expandable structure 102 is an expandable living space structure for a tiny house with the expandable body 104 being an expandable living space body for the tiny house. In this case, the extendable body section 107 is an extendable living space body section for a tiny house comprising a combination of a living room and bedroom, and the extendable body section 108 is an extendable living space body section for a tiny house comprising a combination of a kitchen and bathroom. These extendable living space body sections however could each comprise various other combinations of one or more of a living room, a bedroom, a kitchen, an office, a study, a dining room, etc.

In yet other embodiments, the expandable vehicle 100 may be an expandable broadcast truck or trailer, an expandable mobile office truck or trailer, an expandable box truck or trailer, an expandable cargo truck or trailer, an expandable storage truck or trailer, an expandable flatbed truck or trailer, etc., where the stationary purpose of such vehicles is to provide workspace, cargo space, storage space, or flatbed space. In these embodiments, the vehicle chassis 101 may be a motorized or trailer chassis, and the expandable structure 102 may be an expandable workspace structure, expandable cargo space structure, expandable storage space structure, or expandable flatbed structure and the expandable body 104 may correspondingly be an expandable workspace body, expandable cargo space body, expandable storage space body, or expandable flatbed body. In these cases, the extendable body sections 107 and 108 of the extendable body 104 may be extendable workspace body sections, extendable cargo space body sections, extendable storage space body sections, or extendable flatbed body sections.

Detail of Vehicle Chassis 101

Referring back to FIGS. 3A and 3B, the anchor structures 122 of the expandable frame 103 of the expandable structure 102 are fixed to the vehicle chassis 101, as was described previously. This enables the expandable structure 102 to be fixed to, carried by, and supported by the vehicle chassis 101, as was also described previously.

Figure 4:
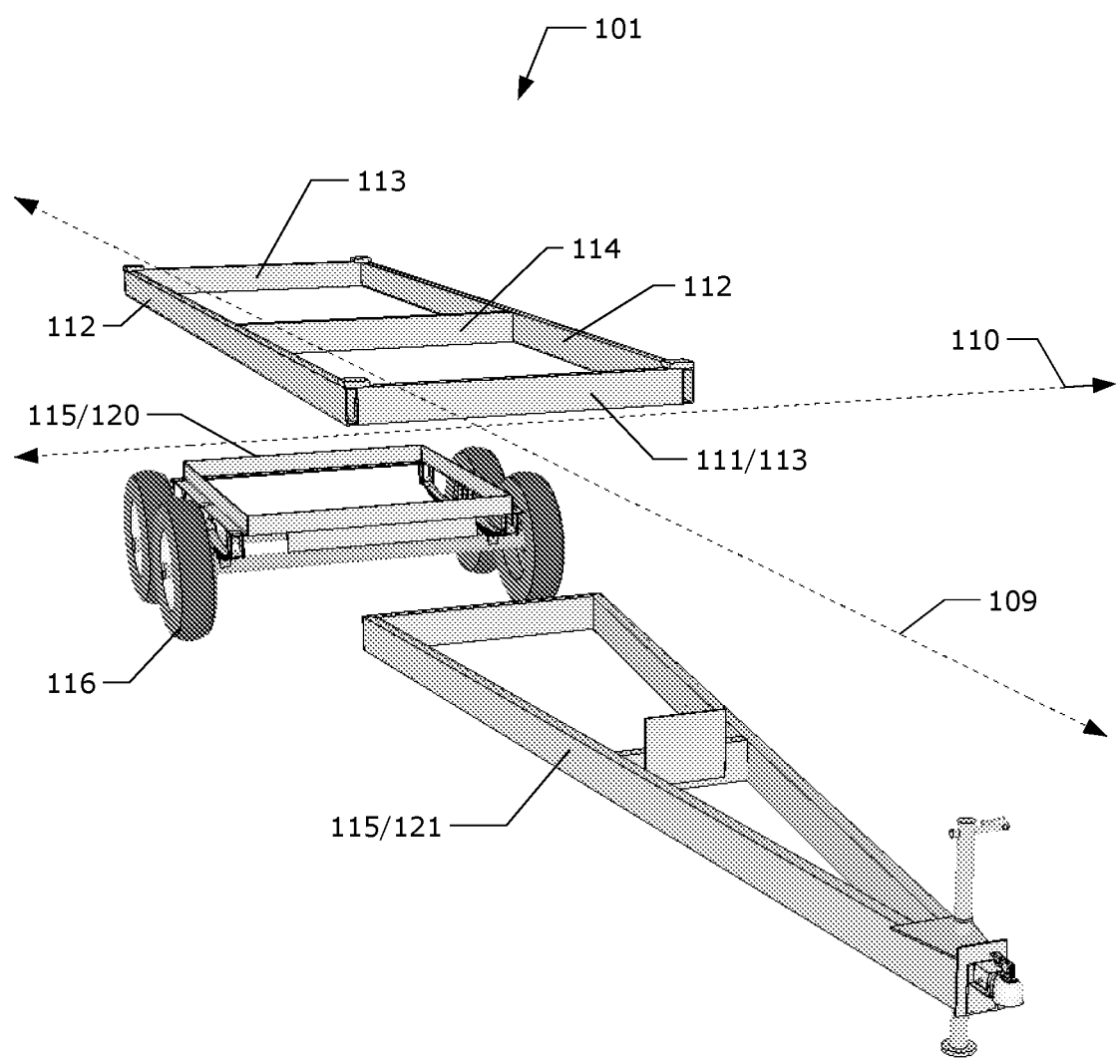
FIG. 4 shows a perspective exploded view of a vehicle chassis of the expandable vehicle.

Turning now to FIG. 4, the vehicle chassis 101 comprises a chassis frame 115, a support foundation 111 fixed to the chassis frame 115, and a wheel system 116 fixed to the chassis frame 115. As will be described in greater detail later and shown in FIGS. 5A and 5B, the anchor structures 122 of the expandable frame 103 of the expandable structure 102 are fixed to the support foundation 111. Thus, the expandable structure 102 is fixed to, carried by, and supported by the vehicle chassis 101 via the support foundation 111.

As shown in FIG. 4, the horizontal length of the support foundation 111 is aligned parallel to the longitudinal axis 109 while the horizontal width of the support foundation 111 is aligned parallel to the lateral axis 110. The support foundation 111 comprises opposing longitudinal side beams 112, opposing lateral side beams 113 fixed to and joining the longitudinal side beams 112, and a lateral cross beam (or support span) 114 fixed to, joining, and spanning the longitudinal side beams 112. The longitudinal side beams 112 are parallelly spaced apart from each other and aligned parallel to the longitudinal axis 109 and perpendicular to and on opposite sides of the lateral axis 109 so as to oppose each other. Similarly, the lateral side beams 113 are parallelly spaced apart from each other and aligned parallel to and on opposite sides of the lateral axis 110 and perpendicular to the longitudinal axis 110 so as to oppose each other. However, the lateral cross beam 114 is parallelly spaced between the lateral side beams 113 and is aligned parallel to and on opposite sides of the lateral axis 110 and perpendicular to the longitudinal axis 110 so as to be parallel to the lateral side beams 113.

Each lateral side beam 113 has opposing beam ends as does each longitudinal side beam 112 and as does the lateral cross beam 114. Each beam end of each beam 113 is fixed to at or near a corresponding beam end of a corresponding longitudinal side beam 112. In this way, each lateral side beam 113 is fixed to and joins the longitudinal side beams 112. On the other hand, each beam end of the lateral cross beam 114 is fixed to a corresponding point midway along the length of the corresponding longitudinal side beam 112 such that the lateral cross beam 114 is fixed to, joins, and spans the longitudinal side beams 112.

In some embodiments, the longitudinal side beams 112, the lateral side beams 113, and the lateral cross beam 114 may comprise metal tubing, such as steel or aluminum. In these embodiments, the lateral side beams 113 may be fixed to the longitudinal side beams 112 by welding or bolting and the lateral cross beam 114 may be similarly fixed to the longitudinal side beams 112 by welding or bolting.

The wheel system 116 includes a suspension system 117 fixed to the chassis frame 115, axles 118 fixed to the suspension system 117, two rotors 119 fixed to each axle 118, and two wheels 119 for each axle 118 with each wheel 119 being fixed to one of the rotors 119. The chassis frame 115 and wheel system 116 may be conventional ones, but also may vary across different embodiments.

In some embodiments, the expandable vehicle 100 may be an expandable trailer where the vehicle chassis 101 is a trailer chassis, as is shown in FIGS. 3A, 3B, and 4. In these embodiments, the chassis frame 115 may comprise an axle subframe 120 to which the wheel system 116 is fixed and a tongue subframe 121 fixed to the wheel system subframe 116, as further shown in FIG. 4. In the case of a trailer chassis that are used for light loads, the wheel system 116 may simply comprise just a single axle 118 and two wheels 119. For trailer chassis that are used for heavier loads, the wheel system 116 may comprise multiple axles 118 and double that number of wheels 119.

In fact, for an embodiment where the expandable vehicle 100 is a tiny house trailer as specifically shown in the FIGS. 3A, 3B, and 4, the vehicle chassis 101 may be a trailer chassis. In this case, the wheel system 116 comprises two axles, four rotors, and four wheels. Furthermore, the tongue subframe 121 may be detachably fixed to the axle subframe 120 by bolting it to the axle subframe 120. The tongue subframe 121 can then be detached when the expandable vehicle 100 is stationary and being used for its stationary purpose and can be re-attached when the expandable vehicle 100 is being moved. Alternatively, the tongue subframe 121 may be permanently fixed to the axle subframe 120 by screwing, strapping, and/or welding it to the rest of the frame.

In other embodiments, the expandable vehicle 100 may be an expandable motor vehicle where the vehicle chassis 101 is a motorized chassis. In the case of a motorized chassis that are used for light loads, the wheel system 116 may simply include just two axles and four wheels. For trailer chassis that are used for heavier loads, the trailer wheel system 116 may include more than two axles and double that number of wheels.

And, yet in other embodiments, the support foundation 111 may actually be part of and/or serve as part of the chassis frame 115. For example, the axle subframe 120 and the tongue subframe 121 may each be fixed to the support foundation 111 but not to each other. In such embodiments, the support foundation 111 acts as a frame bridge connecting the axle subframe 120 and the tongue subframe 121.

In still other embodiments, the support foundation 111 can be made part of the expandable frame 103. Such embodiments will be described in greater detail later.

Detail of Expandable Frame 103

Referring again to FIGS. 3A and 3B, as was described previously, the extendable frame sections 105 and 106 of the expandable frame 103 share the anchor structures 122 and other intersecting and cooperating components that rollably oppose and intersect each other parallel to the lateral axis 110 and on opposite sides of the longitudinal axis 109. This allows the extendable frame sections 105 and 106 to be opposingly, independently, and rollably extended out away from each other and retracted in toward each other in opposite directions parallel to the lateral axis 110 and perpendicular to the longitudinal axis 109. Correspondingly, this also allows the extendable body sections 107 and 108 of the expandable body 104 that are respectively fixed to, carried by, and supported by the extendable frame sections 105 and 106 to be opposingly, independently, and rollably extended and retracted in this same manner.

Figure 5A:
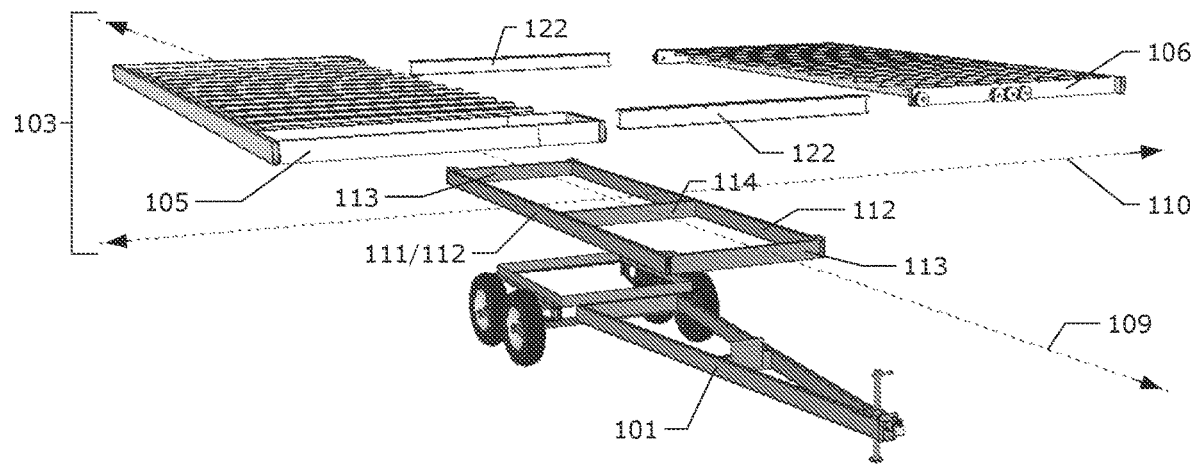
FIG. 5A shows a perspective exploded view of an expandable frame of the expandable structure.
Figure 5B:
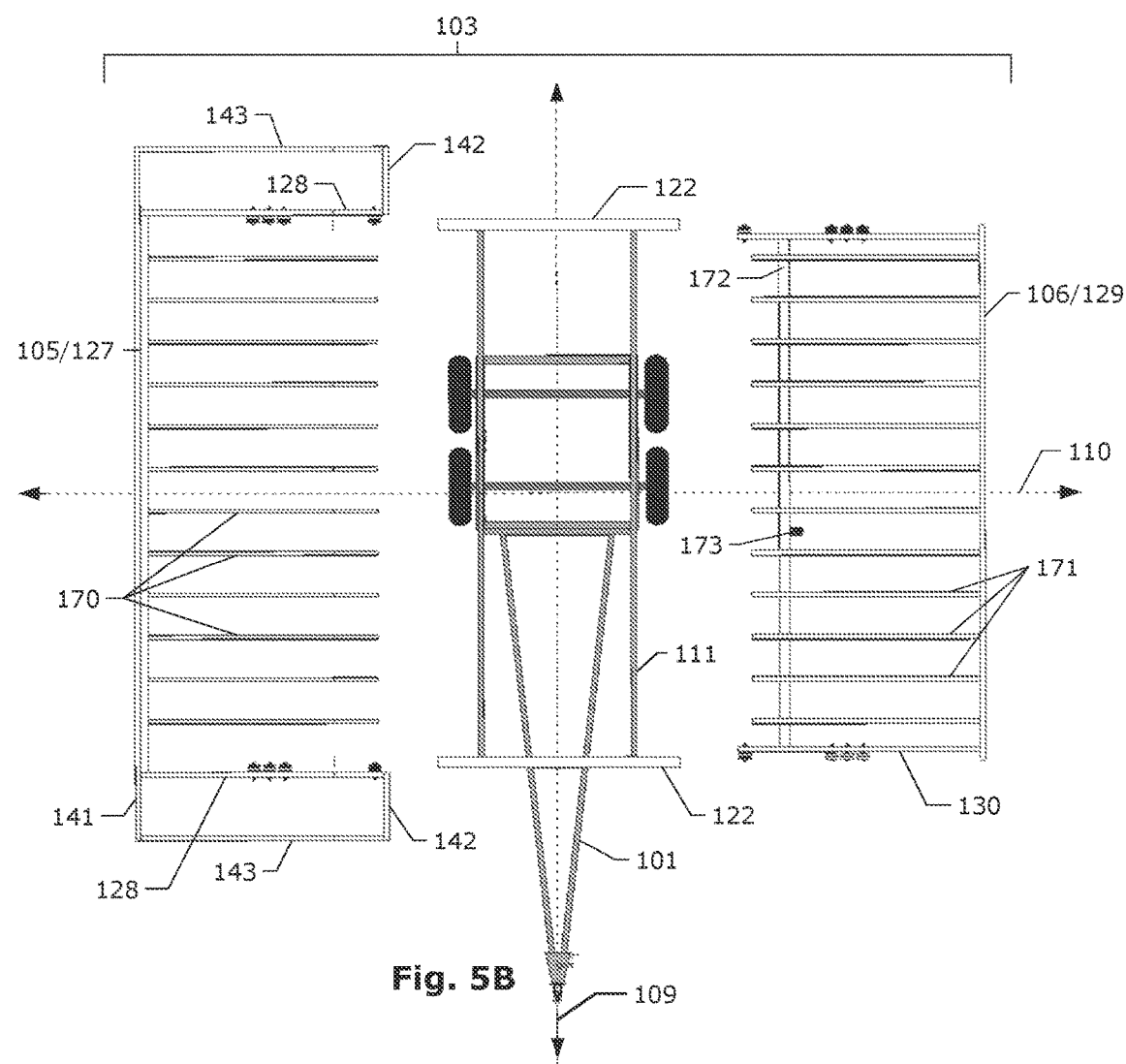
FIG. 5B shows a top exploded view of the expandable frame of the expandable structure.

Turning to FIGS. 5A and 5B, the extendable frame section 105 comprises a longitudinal framing beam 127 and opposing rolling cantilever beams (or joists) 128 fixed to the longitudinal framing beam 127. The longitudinal framing beam 127 is aligned parallel to the longitudinal axis 109 and perpendicular to the lateral axis 110. The rolling cantilever beams 128 are parallelly spaced apart from each other and aligned parallel to and on opposite sides of the lateral axis 110 and perpendicular to the longitudinal axis 110 so as to oppose each other and align with their corresponding anchor structures 122. This allows the rolling cantilever beams 128 to be rollably anchored to the vehicle chassis 101 by the anchor structures 122, as will be described in greater detail later.

The longitudinal framing beam 127 has opposing beam ends and each rolling cantilever beam 128 has opposing framing beam fixing and cantilever beam anchoring ends. The framing beam fixing end of each rolling cantilever beam 128 is fixed to at or near a corresponding beam end of the longitudinal framing beam 127. In this way, each rolling cantilever beam 128 is fixed to the longitudinal framing beam. Furthermore, the cantilever beam anchoring end of each rolling cantilever beam 128 is rollably anchored to its corresponding anchor structure 122. Each rolling cantilever beam 128 is therefore rollably anchored this way.

Likewise, the extendable frame section 106 comprises a longitudinal framing beam 129 and opposing rolling cantilever beams 130. The longitudinal framing beam 129 and opposing rolling cantilever beams 130 operate and are configured, aligned, fixed, and spaced in a corresponding but opposing manner to that just described for the longitudinal framing beam 127 and opposing rolling cantilever beams 128 of the extendable frame section 105.

The extendable frame sections 105 and 106 oppose each other and are aligned on opposite sides of the longitudinal axis 109, as was described previously. Thus, the longitudinal framing beams 127 and 129 of the extendable frame sections 105 and 106 oppose each other and are aligned on opposite sides of the longitudinal axis 109. Each rolling cantilever beam 128 of the extendable frame section 105 is matched with an opposing and corresponding rolling cantilever beam 130 of the extendable frame section 106. The corresponding rolling cantilever beams 128 and 130 oppose each other and are aligned on opposite sides of the longitudinal axis 109 such that they are opposingly and rollably anchored parallel to the lateral axis 110 by the anchor structures 122.

Each rolling cantilever beam 128 of the extendable frame section 105 comprises a lateral frame beam 135 and guide wheels 137 fixed to the lateral support beam 135. Likewise, each rolling cantilever beam 130 of the extendable frame section 106 comprises a lateral frame beam 136 and guide wheels 138 fixed to the lateral support beam 136.

In some embodiments, the longitudinal framing beams 127 and 129 and the lateral frame beams 135 and 136 may comprise metal tubing, such as steel or aluminum. In this case, the lateral frame beams 135 and 136 may be fixed to the longitudinal framing beams 127 and 129 by welding or bolting. And, the guide wheels 137 and 138 of the rolling cantilever beams 128 and 130 may be bolted to the lateral support beams 135 and 136.

The anchor structures 122 are fixed to the support foundation 111 of the vehicle chassis 101. The anchor structures 122 are fixed to and along the lateral side beams 113 at opposite ends of the support foundation 111. Thus, the anchor structures 122 are parallelly spaced apart from each other and aligned parallel to and on opposite sides of the lateral axis 110 and perpendicular to the longitudinal axis 110 so that they oppose each other. As described earlier, the anchor structures 122 opposingly and rollably anchor the rolling cantilever beams 128 and 129 of the extendable frame sections 105 and 106 to the support foundation 111. Correspondingly, this makes the extendable frame sections 105 and 106 opposingly and rollably anchored to the support foundation 111.

Figure 6A:
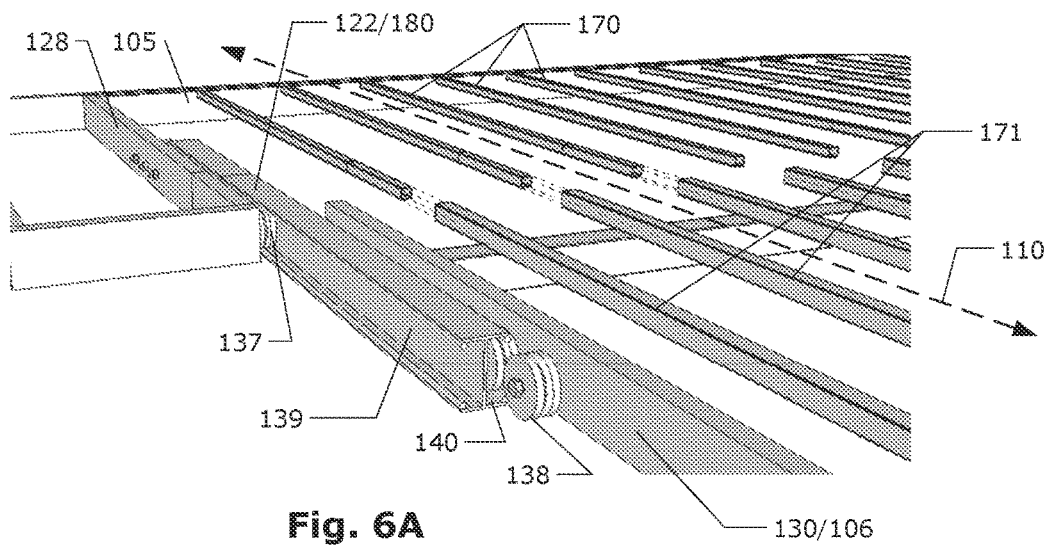
FIG. 6A shows an exploded perspective view of rolling cantilever beams and telescoping cantilever joists of the expandable platform.
Figure 6B:
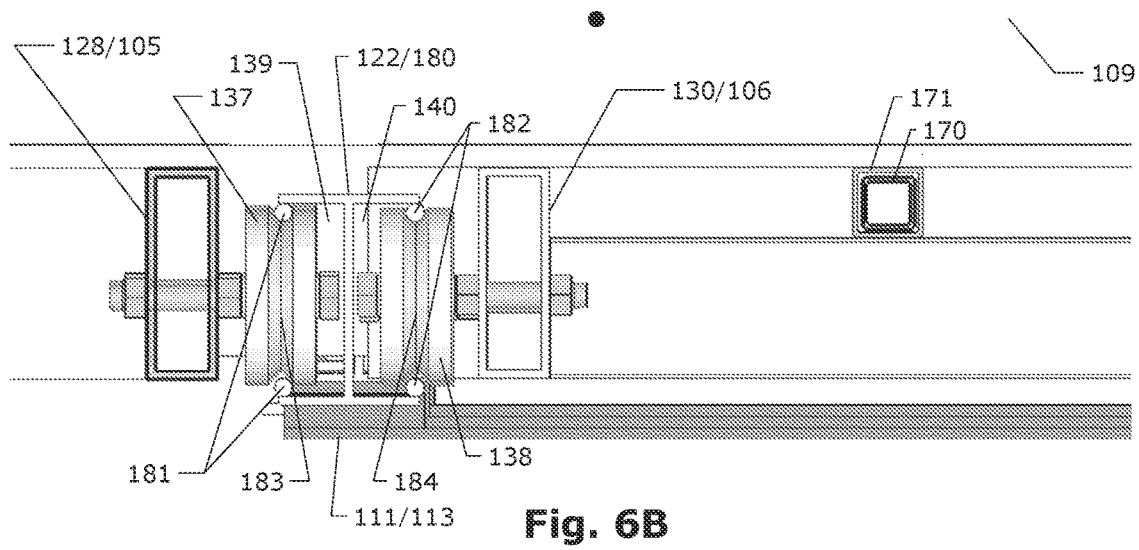
FIG. 6B shows a cross sectional view of the rolling cantilever beams and the telescoping cantilever joists of the expandable platform.
Figure 6C:
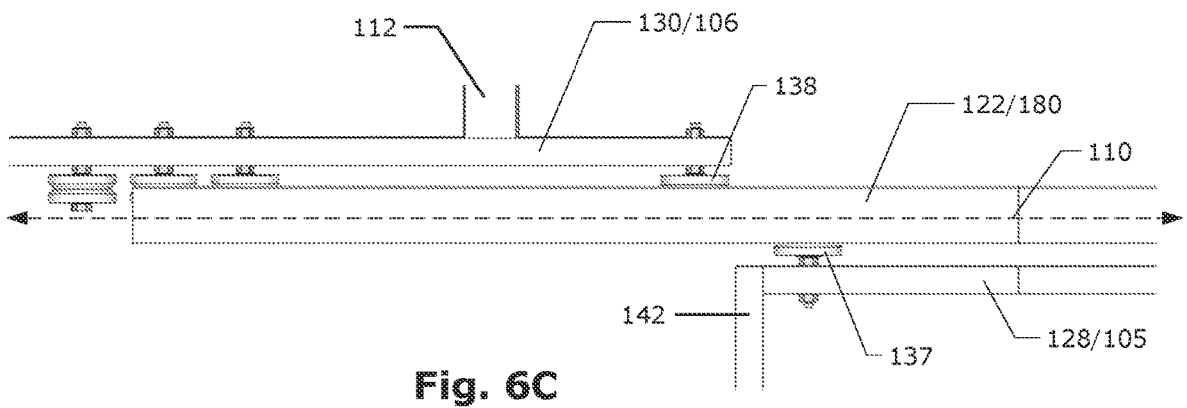
FIG. 6C shows a top view of the rolling cantilever beams and the telescoping cantilever joists of the expandable platform.

Referring to FIGS. 6A to 6C, as was described earlier, each anchor structure 122 is shared by and matched with a corresponding rolling cantilever beam 128 of the extendable frame section 105 and an opposing and corresponding rolling cantilever beam 130 of the extendable frame section 106. Each anchor structure 122 has guide slots 139 and 140 that overlap and are on opposite sides of the anchor structure 122. These corresponding rolling cantilever beams 128 and 130 are aligned but slightly offset (i.e., spaced apart) so as to rollably oppose and interest (i.e., bypass) each other in opposite directions parallel to the lateral axis 110 but without contacting each other. This enables the guide slots 139 and 140 to respectively receive the guide wheels 137 and 138 of the rolling cantilever beams 128 and 130 at their respective cantilever beam anchoring ends. In this way, each anchor structure 122 opposingly and rollably anchors the corresponding rolling cantilever beams 128 and 130 at their respective cantilever beam anchoring ends to the support foundation 111 of the vehicle chassis 101 so that the extendable frame sections 105 and 106 are opposingly and rollably anchored in this manner as well.

The guide wheels 137 and 138 are spaced apart for appropriate distribution of the imparted forces respectively on and along the guide slots 139 and 140 to enable proper cantilevering anchoring of the corresponding rolling cantilever beams 128 and 129. More specifically, the rear wheels of the guide wheels 137 serve as a fulcrum point by applying a downward force on the bottom surface of the guide slot 139 while the front wheel of the guide wheels 137 serve as a counterweight by applying an upward force on the upper surface of the guide slot 139. Similarly, the rear wheels of the guide wheels 138 serve as a fulcrum point by applying a downward force on the bottom surface of the guide slot 140 while the front wheel of the guide wheels 138 serve as a counterweight by applying an upward force on the upper surface of the guide slot 140.

In some embodiments, such as those specifically shown in FIGS. 6A to 6C, the anchor structures 122 may comprise H beams 180 made of metal, such as steel or aluminum, and fixed to the lateral side beams 113 of the support foundation 111 by welding or bolting. In this case, each such anchor structure 122 may comprise rounded guide strips 181 and 182 for the guide slots 139 and 140 that are also made of metal, such as steel or aluminum. The guide strips 181 oppose each other and are welded to and run along the edges of the upper and lower surfaces of the guide slot 139. Similarly, the guide strips 182 oppose each other and are welded to and run along the edges of the upper and lower surfaces of the guide slot 140.

For these embodiments, the guide wheels 137 and 138 of the rolling cantilever beams 128 and 130 may comprise grooves 183 and 184 aligned to the guide strips 181 and 182 for the guide slots 139 and 140. The grooves 183 of the wheels 137 of each rolling cantilever beam 128 correspond to and are aligned to the guide strips 181 of the corresponding anchor structure 122 to which the rolling cantilever beam 128 is rollably anchored. Similarly, the grooves 184 of the wheels 138 of each rolling cantilever beam 130 correspond to and are aligned to the guide strips 182 of the corresponding anchor structure 122 to which the rolling cantilever beam 130 is rollably anchored.

Alternatively, in some embodiments, the anchor structures 122 may comprise guide wheels while the rolling cantilever beams 128 and 130 may not. In this case, each anchor structure 122 may be configured to have guide wheels above and below the guide slot 139 to rollably receive the rolling cantilever beams 128 and guide wheels above and below the guide slot 140 to rollably receive the rolling cantilever beams 130.

Referring back to FIGS. 5A and 5B, the extendable frame section 105 further comprises parallel telescoping cantilever joists 170 fixed to the longitudinal framing beam 127. The telescoping cantilever joists 170 are parallelly and equally spaced apart from each other and aligned parallel to the lateral axis 110 and perpendicular to the longitudinal axis 110.

Similar to each rolling cantilever beam 128 of the extendable frame section 105, each telescoping cantilever joist 170 has opposing framing beam fixing and cantilever joist intersecting ends. The framing beam fixing end of each telescoping cantilever joist 170 is fixed to the longitudinal framing beam 127 at a point along the length of the longitudinal framing beam 127 so that it is equally spaced from an adjoining telescoping cantilever joist 170. In this way, the telescoping cantilever joist 170 is fixed to the longitudinal framing beam 127.

Likewise, the extendable frame section 106 further comprises parallel telescoping cantilever joists 171 fixed to the longitudinal framing beam 129. The telescoping cantilever joists 171 operate and are configured, aligned, fixed, and spaced in a corresponding but opposing manner to that just described for the telescoping cantilever joists 170 of the extendable frame section 105.

Referring to FIGS. 5A and 5B and 6A to 6C, each telescoping cantilever joist 170 is aligned with an opposing and corresponding telescoping cantilever joist 171. The corresponding telescoping cantilever joists 170 and 171 are in fact aligned so as to slidably and telescopingly oppose and interest each other in opposite directions parallel to the lateral axis 110. More specifically, each telescoping cantilever joist 171 is tubular and its cantilever joist intersecting end slidably and telescopingly receives the cantilever joist intersecting end of the corresponding telescoping cantilever joist 170. In this way, the corresponding telescoping cantilever joists 170 and 171 and provide mutual telescoping anchoring of each other and further enable the extendable frame sections 105 and 106 to be opposingly and rollably anchored in the manner described earlier.

In some embodiments, the telescoping cantilever joists 170 and 171 may comprise metal tubing, such as steel or aluminum. In this case, the telescoping cantilever joists 170 and 171 may be fixed to the longitudinal framing beams 127 and 129 by welding or bolting.

And, the telescoping configuration of the telescoping cantilever joists 170 and 171 may be reversed in some embodiments. In this case, the telescoping cantilever joists 170 would receive the telescoping cantilever joists 171.

Furthermore, in some embodiments, the telescoping cantilever joists 170 or the telescoping cantilever joists 171 may comprise wheels fixed thereto. This would allow the telescoping cantilever joists 170 to rollaby and telescopingly receive the telescoping cantilever joists 171 or the telescoping cantilever joists 171 to rollaby and telescopingly receive the telescoping cantilever joists 170, depending the embodiment.

The extendable frame section 106 further comprises a longitudinal support beam 172. The longitudinal framing beam 127 is aligned parallel to the longitudinal axis 109 and perpendicular to the lateral axis 110. The longitudinal support beam 172 is fixed to and joins the rolling cantilever beams 130. And, the telescoping cantilevering joists 171 are fixed to the longitudinal support beam 172.

The longitudinal support beam 172 has opposing beam ends. Each beam end of the longitudinal support beam 172 is fixed to a corresponding point near the rolling end of a corresponding rolling cantilever beam 130. Furthermore, each telescoping cantilevering joist 171 is fixed to the longitudinal framing beam 127 at a point along the length of the longitudinal support beam 172 so that it is equally spaced from an adjoining telescoping cantilever joist 171.

The extendable frame section 106 further comprises a support wheel assembly 173 fixed to the longitudinal support beam 172. The support wheel assembly 173 comprises a wheel and is fixed to the longitudinal support beam 172 so that the wheel is aligned with and rolls on the lateral cross beam 114 of the support foundation 111 of the vehicle chassis 101. The longitudinal support beam 172 and the support wheel assembly 173 therefore rollably support the extendable frame section 105 as it is rollably anchored in the manner discussed earlier. Since the telescoping cantilever joists 170 and 171 of the extendable frame sections 105 and 106 are telescopingly shared, this means that the extendable frame section 105 is also rollably supported by the longitudinal support beam 172 and the support wheel assembly 173 as it is rollably anchored in the manner discussed earlier.

Turning now to FIGS. 7A and 7B and FIGS. 8A and 8B, as described previously, the extendable frame sections 105 and 106 of the expandable frame 103 are correspondingly extended and retracted as the expandable body 104 is expanded and contracted, as shown in FIGS. 3A and 3B, during operation.

Figure 7A:
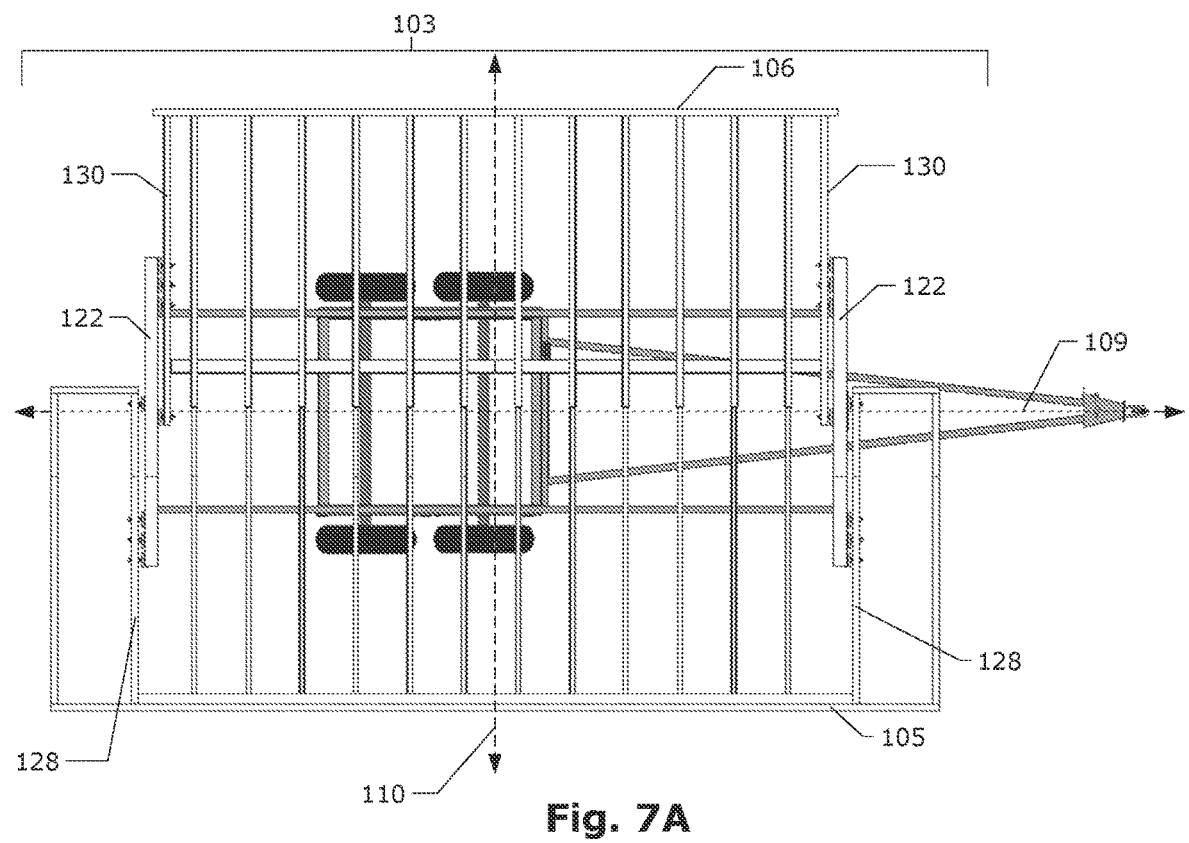
FIG. 7A shows a top view of the expandable frame of the expandable structure in its corresponding expanded state for the expanded state of the expandable structure.
Figure 8A:
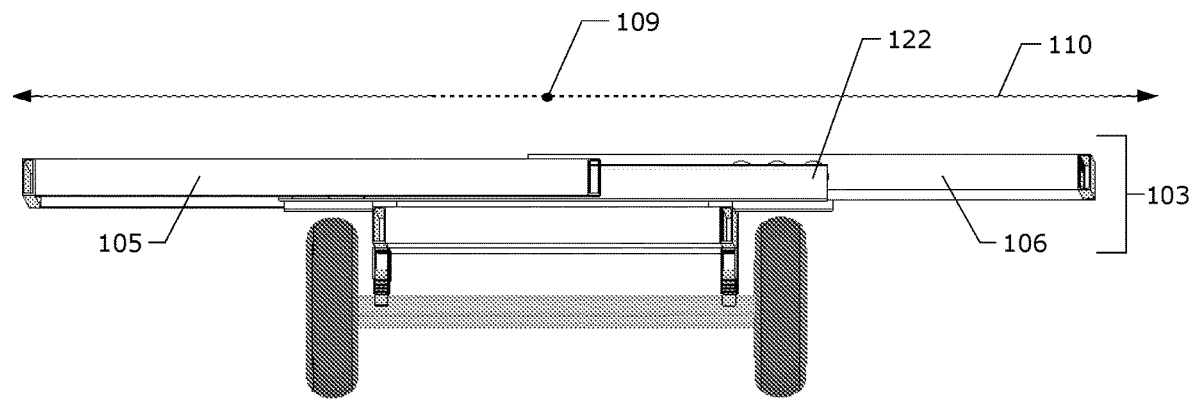
FIG. 8A shows a cross sectional front view of the expandable frame of the expandable structure in its corresponding expanded state for the expanded state of the expandable structure.

FIGS. 7A and 8A show the extendable frame sections 105 and 106 in their extended positions for the expanded states of the expandable frame 103 and, and as shown in FIG. 3A, the expandable body 104. Here, the extendable frame sections 105 and 106 are opposingly, independently, and rollably extended out away from each other in the manner described earlier. Correspondingly, the rolling cantilevers 128 and 130 of the extendable frame sections 105 and 106 are opposingly, independently, and rollably extended out away from each other in this same manner and so are the rolling cantilevers 128 and 130 of the extendable frame sections 105 and 106.

As shown in FIG. 7A, this results in a relatively small bypassing intersection of the rolling cantilevers 128 and 130 of the extendable frame sections 105 and 106 along the anchor structures 122. And, this also results in a relatively small telescoping intersection of the telescoping cantilevers 128 and 130 of the extendable frame sections 105 and 106. And, the net result is a relatively small intersection between the frame sections 105 and 106 and the support area of the expandable frame 103 is expanded.

Figure 7B:
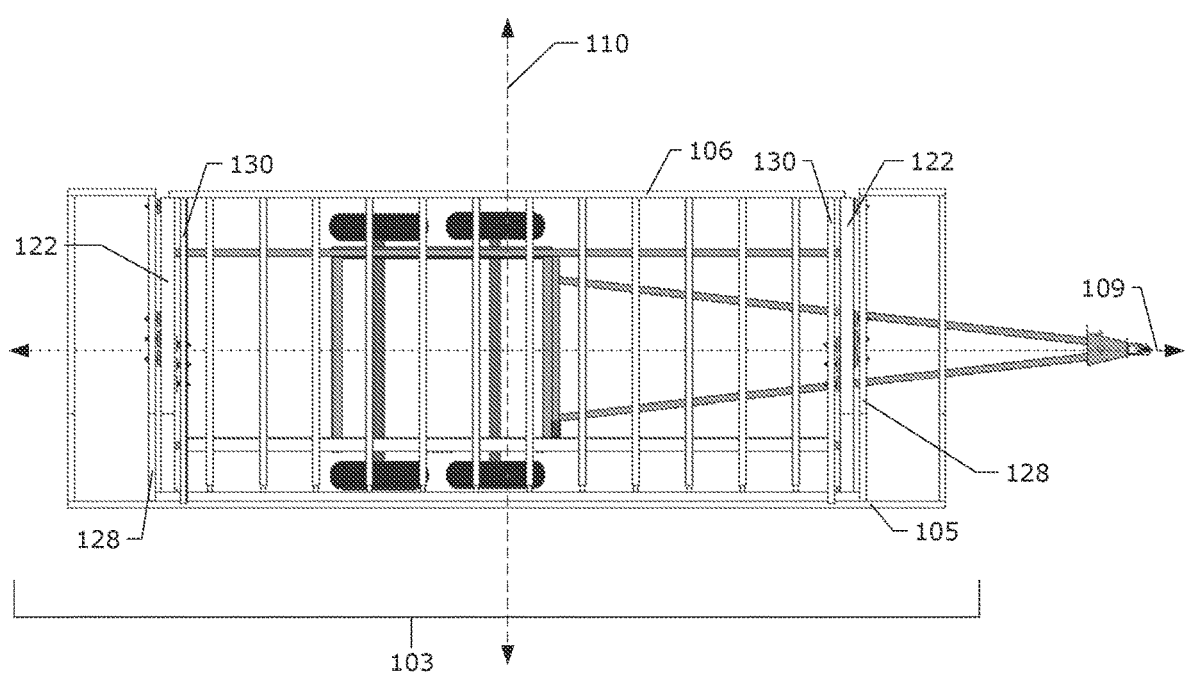
FIG. 7B shows a top view of the expandable frame of the expandable structure in its corresponding contracted state for the contracted state of the expandable structure.
Figure 8B:
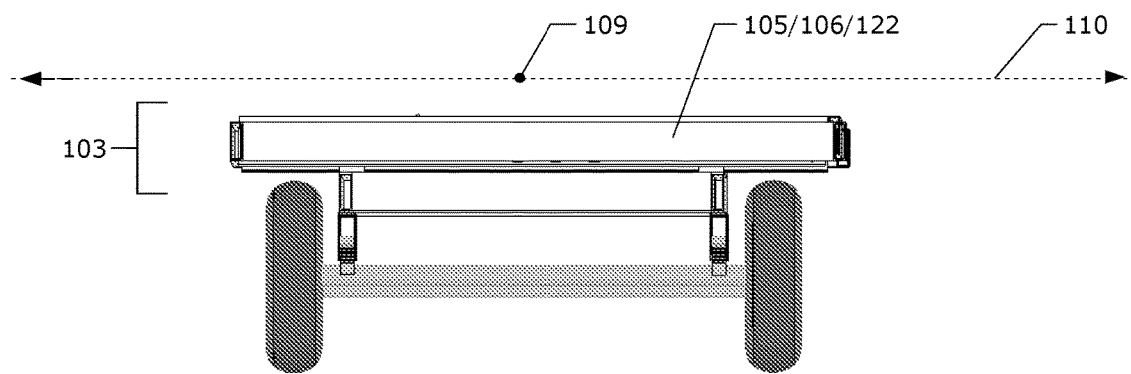
FIG. 8B shows a cross sectional front view of the expandable frame of the expandable structure in its corresponding contracted state for the contracted state of the expandable structure.

In contrast, FIGS. 7B and 8B show the extendable frame sections 105 and 106 in their retracted positions for the contracted states of the expandable frame 103 and, and as shown in FIG. 3B, the expandable body 104. In this case, and in the manner described earlier, the extendable frame sections 105 and 106 are opposingly, independently, and rollably retracted in toward each other to bring them to their extended positions. The rolling cantilevers 128 and 130 of the extendable frame sections 105 and 106 are opposingly, independently, and rollably retracted in toward each other correspondingly in the same manner. And, the rolling cantilevers 128 and 130 of the extendable frame sections 105 and 106 are opposingly, independently, and rollably retracted in toward each other also correspondingly in the same manner.

Here, as shown in FIG. 7B, this results in a relatively large bypassing intersection of the rolling cantilevers 128 and 130 of the extendable frame sections 105 and 106 along the anchor structures 122. And, this results in a relatively large telescoping intersection of the telescoping cantilevers 128 and 130 of the extendable frame sections 105 and 106 as well. The net result is a relatively large intersection between the frame sections 105 and 106 and the support area of the expandable frame 103 is expanded.

In some embodiments, such as those shown in FIGS. 5A and 5B, the extendable frame section 105 may be substantially larger than the extendable frame section 106 and provide a substantially larger support area. In this case, the extendable frame section 105 may also comprise opposing longitudinal frame beams 141 and 142 and lateral frame beams 143 to increase the support area along its length at the opposite ends of the extendable frame section 105. This means that there is a substantially larger overlap between the interior of the extendable frame section 105 and the exterior of the extendable frame section 106.

The longitudinal frame beam 141 is aligned parallel to the longitudinal axis 109 and perpendicular to the lateral axis 110 and is fixed to the longitudinal frame beam 127 along the length of the longitudinal frame beam 127. The longitudinal frame beam 141 is longer than the longitudinal frame beam 127 and extends past both beam ends of the longitudinal frame beam 127. The longitudinal frame beams 142 are also aligned parallel to the longitudinal axis 109 and perpendicular to the lateral axis 110. The longitudinal frame beams 142 are shorter than the longitudinal frame beam 141 and are fixed to and extend out from their corresponding rolling cantilever beams 128 in opposite directions parallel to the longitudinal axis 109. The lateral frame beams 143 are parallelly spaced apart from each other and aligned parallel to and on opposite sides of the lateral axis 110 and perpendicular to the longitudinal axis 110 so as to oppose each other. The lateral frame beams 143 are fixed to and join the longitudinal frame beam 141 and their corresponding longitudinal frame beams 142.

Still referring to FIGS. 5A and 5B, in some embodiment, the vehicle chassis 101 may be detachably fixed to the expandable frame 103. This may be done by bolting the support foundation 111 of the vehicle chassis 101 to the underlying chassis frame 115 of the vehicle chassis 101 so that the support foundation 111 of the vehicle chassis 101 is detachably fixed to the chassis frame 115. This allows for the chassis frame 115 to be detached from the support foundation 111 by unbolting it from the support foundation 111. As a result, the chassis frame 115 is also detached from the expandable frame 103 that it is fixed to, carried by, and supported by the support foundation 111. This may be done when the expandable vehicle 100 is stationary and to be used for its stationary purpose and when the expandable frame 103 is in its expanded state and supported from below with jacks or other types of support structures. This also allows for the vehicle chassis 101 to be re-attached to the expandable frame 103 when the expandable vehicle 100 is to be moved. This is done by re-bolting the chassis frame 115 to the support foundation 111 to re-attach it to the support foundation 111. As a result, the vehicle chassis 101 is again re-attached to the expandable frame 103.

In some embodiments, the vehicle chassis 101 may be permanently fixed to the expandable frame 103 by screwing, strapping, and/or welding it to the support foundation 114. Since the expandable structure 102 includes the expandable frame 103, the vehicle chassis 101 is permanently fixed to the expandable structure 102 from being screwed, strapped, and/or welded to the support foundation 114. The vehicle chassis 101 is therefore always attached to the expandable frame 103 and the expandable structure 102 as well regardless of whether the expandable vehicle 100 is stationary and being used for its stationary purpose or whether it is being moved.

Furthermore, in some embodiments, the extendable frame sections 105 and 106 may be opposingly, independently, and rollably extended and retracted in the manner described earlier using a motor. In this case, the expandable frame 103 may comprise a motor to do so.

Alternatively, in other embodiments, the extendable frame sections 105 and 106 may be opposingly, independently, and rollably extended and retract manually in the manner described earlier.

Detail of Expandable Body 104

Referring again to FIGS. 3A and 3B, as was described previously, the opposing extendable body sections 107 and 108 of the expandable body 104 are respectively fixed to, carried by, and supported by the opposing extendable frame sections 105 and 106 of the expandable frame 103. Since the extendable frame sections 105 and 106 can be opposingly, independently, and rollably extended out away from each other and retracted in toward each other in opposite directions parallel to the lateral axis 110 and perpendicular to the longitudinal axis 109, so too can the extendable body sections 107 and 108.

Figure 9A:
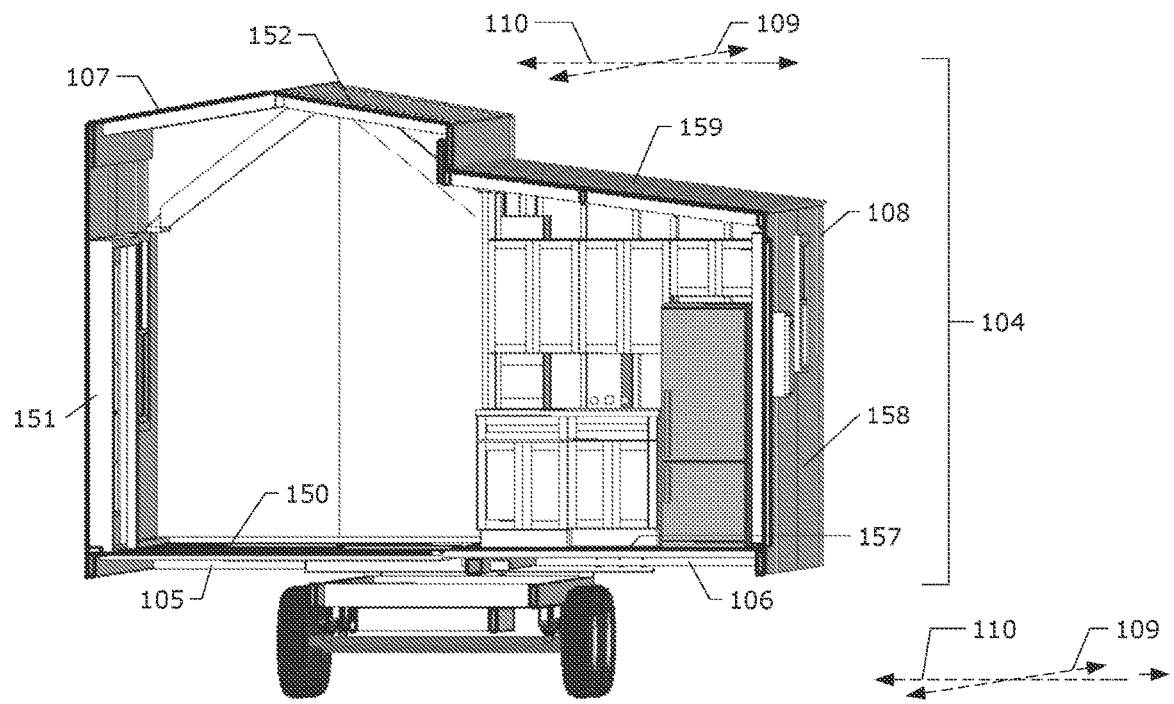
FIG. 9A shows a cross sectional perspective view of the interior of an expandable body of the expandable structure in its corresponding expanded state for the expanded state of the expandable structure.
Figure 9B:
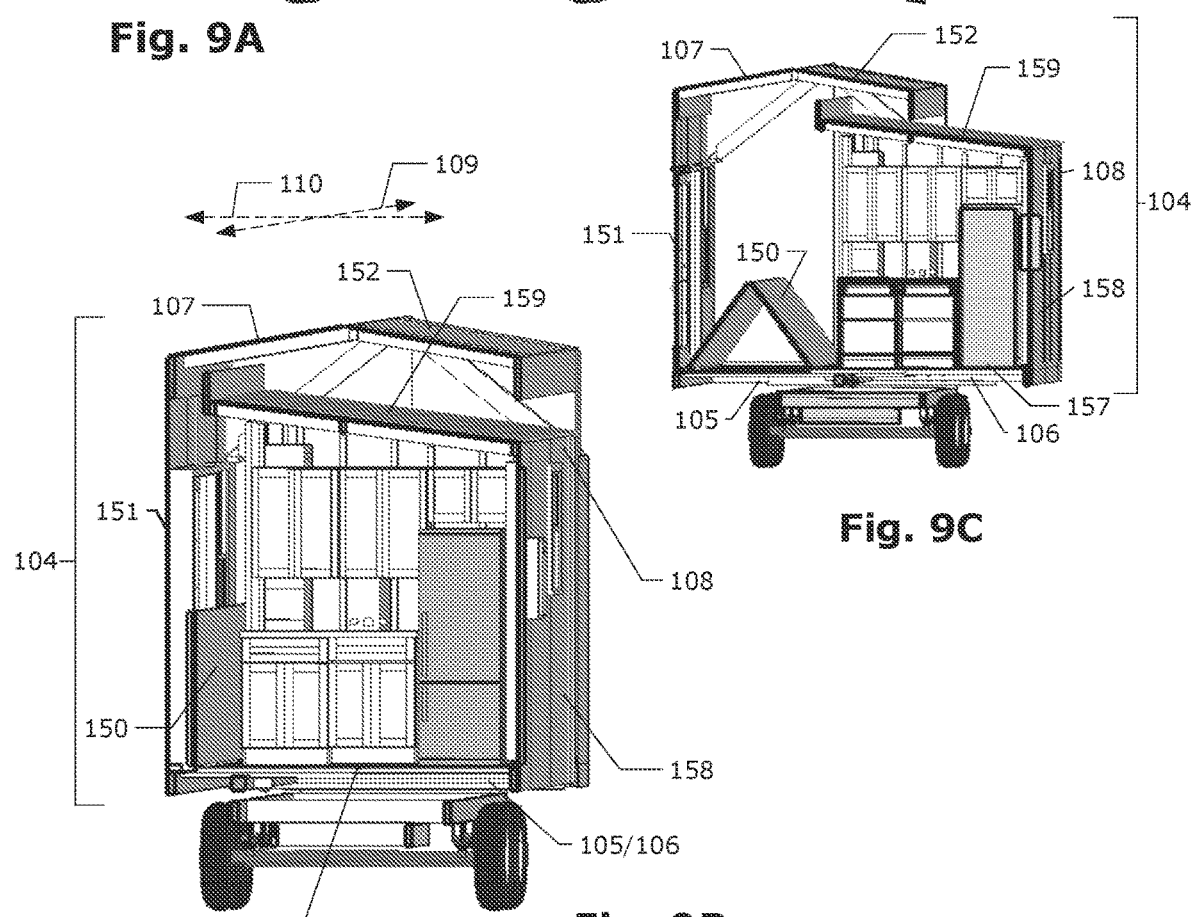
FIG. 9B shows a cross sectional perspective view of the interior of the expandable body of the expandable structure in its corresponding contracted state for the contracted state of the expandable structure.
Figure 9C:
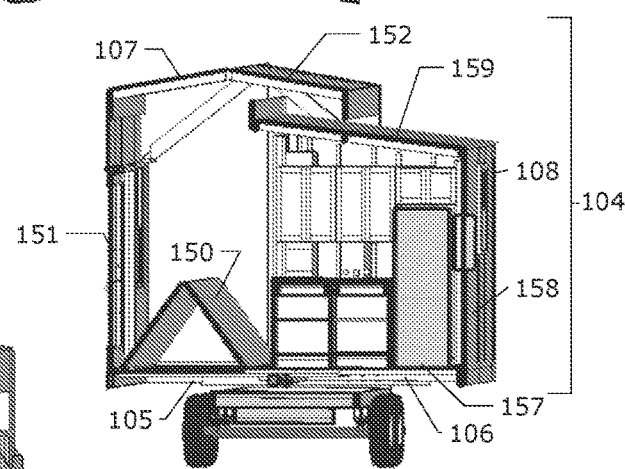
FIG. 9C shows a cross sectional perspective view of the interior of the expandable body of the expandable structure in its corresponding transition between its expanded and contracted states for the transition between the expanded and contracted states of the expandable structure.

Turning now to FIGS. 9A to 9C, the extendable body section 108 of the expandable body 104 comprises a flat floor portion 157, a perimeter portion (or partial perimeter) 158, and a roof portion 159. As will be described in greater detail shortly, the flat floor portion 157 is securely fixed to, carried by, and supported by the corresponding extendable frame section 106, the perimeter portion 158 is also securely fixed to, carried by, and supported by the corresponding extendable frame section 106, and the roof portion 159 is securely fixed to, carried by, and supported by the corresponding perimeter portion 158. As a result, the flat floor portion 157, the perimeter portion 158, and the roof portion 159 are all together aligned parallel to the longitudinal axis 109 and perpendicular to the lateral axis 110.

Similarly, the extendable body section 107 of the expandable body 104 comprises a foldable (or collapsible) floor portion 150, a perimeter portion 151, and a roof portion 152. Unlike the flat floor portion 157 of the extendable body section 108, the foldable floor portion 150 is foldably fixed to, carried by, and supported by the corresponding extendable frame section 105, as will be described in greater detail shortly. But, like the perimeter portion 158 and roof portion 159 of the extendable body section 108, the perimeter portion 151 is securely fixed to, carried by, and supported by the corresponding extendable frame section 105 and the roof portion 152 is securely fixed to, carried by, and supported by the corresponding perimeter portion 152, as will also be described in greater detail shortly. Consequently, the foldable floor portion 150, the perimeter portion 152, and the roof portion 153 are all together aligned parallel to the longitudinal axis 109 and perpendicular to the lateral axis 110.

The flat and foldable floor portions 157 and 150 of the extendable body sections 108 and 107 oppose each other and are aligned parallel to and on opposite sides of the longitudinal axis 109 and perpendicular to the lateral axis 110. More specifically, the horizontal lengths of the flat floor portion 157 and the foldable floor portion 150 are aligned parallel to and on opposite sides of the longitudinal axis 109 while their horizontal widths are aligned parallel to the lateral axis 110. In this way, the flat and foldable floor portions 157 and 150 together form an expandable floor of the expandable body 104 and together define the interior area of the extendable body 104.

Figure 10A:
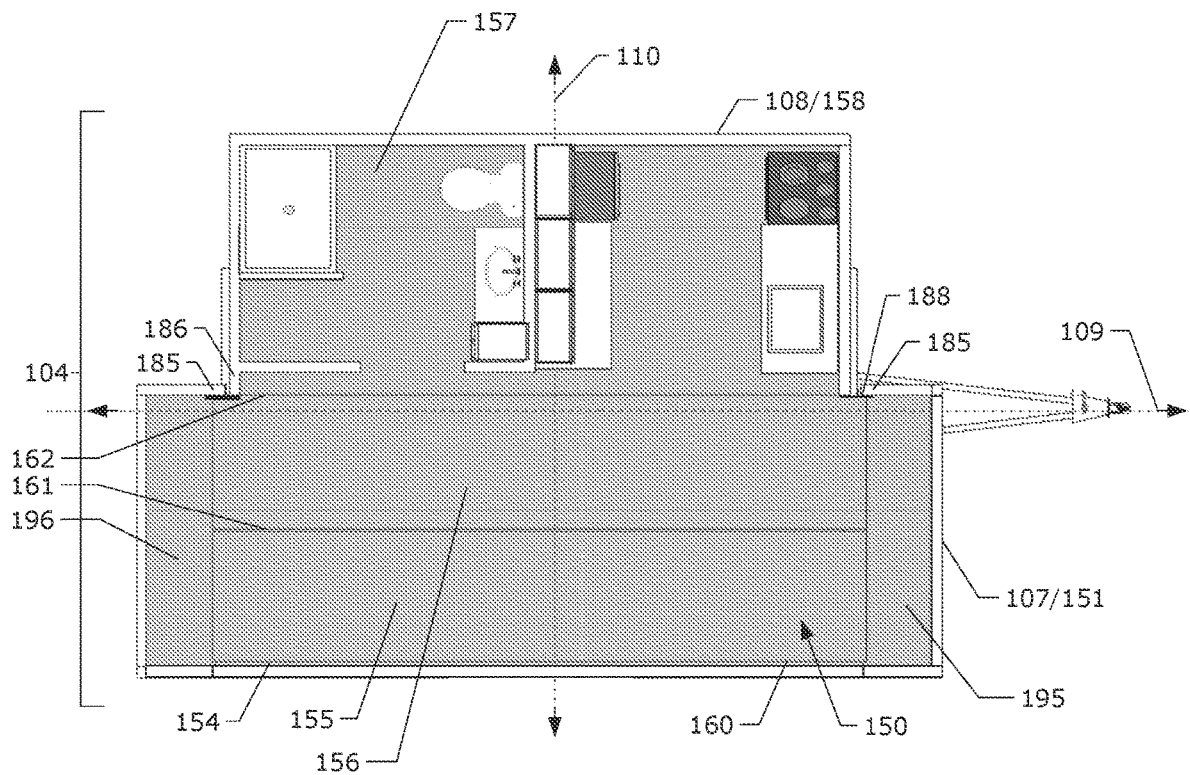
FIG. 10A shows a cross sectional top view of the interior of the expandable body of the expandable structure in its corresponding expanded state for the expanded state of the expandable structure.
Figure 10B:
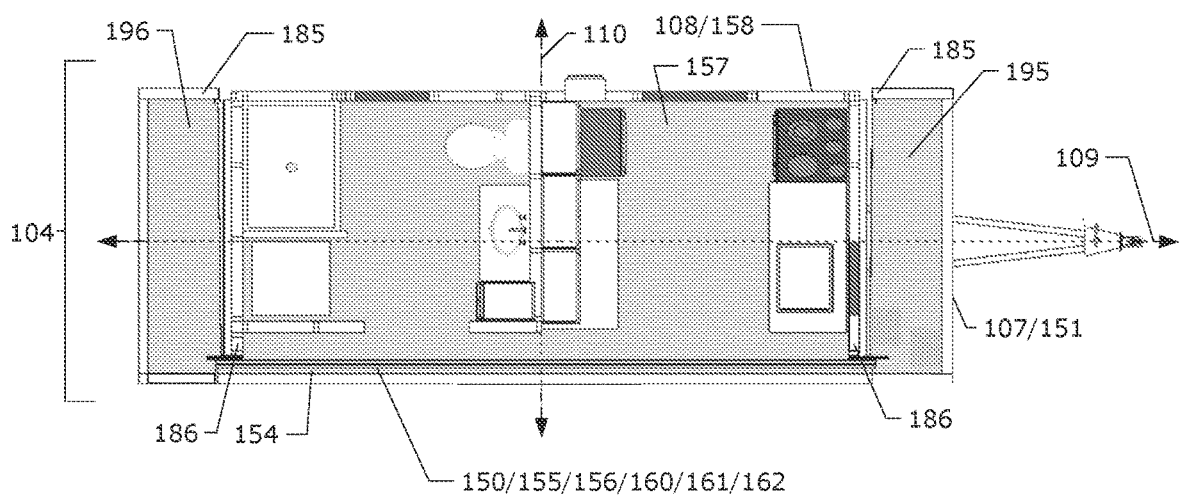
FIG. 10B shows a cross sectional top view of the interior of the expandable body of the expandable structure in its corresponding contracted state for the contracted state of the expandable structure.

Referring now to FIGS. 10A and 10B, the flat floor portion 157 of the extendable body section 108 lies horizontally flat on the extendable frame section 106 and is not foldable. The flat floor portion 157 has a horizontal length aligned parallel to the longitudinal axis 109 and a horizontal width parallel to the lateral axis 110. Since the flat floor portion 157 is not foldable, its horizontal width does not vary as the extendable body section 108 is retracted and extended. The flat floor portion 157 provides one portion of the expandable floor of the expandable body 104 defined by it and the foldable floor portion 150 of the expandable body section 107.

The flat floor portion 157 is securely fixed to, carried by, and supported by the longitudinal fame beam 129, the rolling cantilever beams 130, and the telescoping cantilever joists 171 of the extendable frame section 106 shown in FIGS. 7A and 7B. This is the case when the extendable body section 108 is in its extended and retracted positions as respectively shown on FIGS. 10A and 10B and when the extendable frame section 106 is correspondingly in its extended and retracted positions as respectively shown in FIGS. 7A and 7B.

In some embodiments, the flat floor portion 157 may comprise plywood. In this case, the flat floor portion 157 may be fixed to extendable frame section 106 by screwing, bolting, gluing, and/or strapping it to the longitudinal fame beam 129, the rolling cantilever beams 130, and/or the telescoping cantilever joists 171 of the extendable frame section 105.

As further shown in FIGS. 10A and 10B, unlike the flat floor portion 157 of the extendable body section 108, the foldable floor portion 150 of the extendable body section 107 is foldable. But like the flat floor portion 157, the foldable floor portion 150 has a horizontal length aligned parallel to the longitudinal axis 109 and a horizontal width parallel to the lateral axis 110. The horizontal width varies as the foldable floor portion 150 is folded and unfolded parallel to the lateral axis 110 as the extendable body section 107 is respectively retracted and extended. The foldable floor portion 150 provides the other portion of the expandable floor of the expandable body 104 defined by it and the flat floor portion 157 of the expandable body section 108.

The foldable floor portion 150 is unfolded and lies horizontally flat on the extendable frame section 105 when the extendable body section 107 is in its extended position, as shown in FIG. 10A. At this point, the extendable frame section 105 is correspondingly in its extended position shown, which is shown in FIG. 7A. Conversely, the foldable floor portion 150 is folded and sits vertically upright on the extendable frame section 105 when the extendable body section 107 is in its contracted position as shown in FIG. 10B. Here, the extendable frame section 105 is correspondingly in its retracted position, which is shown in FIG. 7B.

The foldable floor portion 150 comprises a flat floor section (or subportion) 154. The flat floor section 154 has relatively narrow horizontal width and its horizontal length is aligned parallel to the longitudinal axis 109 and its horizontal width parallel to the lateral axis 110. The flat floor section 154 lies horizontally flat on and is securely fixed to, carried by, and supported by the longitudinal fame beam 127, the rolling cantilever beams 128, and the telescoping cantilever joists 170 of the extendable frame section 105 shown in FIGS. 7A and 7B.

As further shown in FIGS. 10A and 10B, the foldable floor portion 150 also comprises folding floor sections (or subportions) 155 and 156 and floor hinges 160, 161, and 162. The folding floor sections 155 and 156 have relatively wide horizontal widths and, like the flat floor section 154, have their horizontal lengths aligned parallel to the longitudinal axis 109 and their horizontal widths parallel to the lateral axis 110. The folding floor section 155 is hingedly fixed to the flat floor section 154 by the floor hinge 160. The folding floor sections 155 and 156 are hingedly fixed to each other by the floor hinge 161 and are carried and supported by the rolling cantilever beams 128 and the telescoping cantilever joists 170 of the extendable frame section 105 shown in FIGS. 7A and 7B. The folding floor sections 156 is further hingedly fixed to the flat floor portion 157 of the extendable body section 107 by the floor hinge 162.

In some embodiments, the folding floor sections 155 and 156 and the flat floor section 154 of the foldable floor portion 150 may comprise plywood. In this case, the flat floor section 154 may be fixed to the extendable frame section 105 by screwing, bolting, gluing, and/or strapping it to the longitudinal fame beam 127, the rolling cantilever beams 128, and/or the telescoping cantilever joists 170 of the extendable frame section 105.

Furthermore, in some embodiments, the floor hinges 160, 161, and 162 may comprise piano or continuous hinges. Such hinges may run the lengths of the flat floor section 154, the folding floor sections 155 and 156, the flat floor portion 157, as is shown in FIGS. 10A and 10B.

The foldable floor portion 150 is unfolded and lies horizontally flat on the extendable frame section 105 when the extendable body section 107 is in its extended position, as shown in FIG. 10A. At this point, the extendable frame section 105 is correspondingly in its extended position, which is shown in FIG. 7A. Conversely, the foldable floor portion 150 is folded and sits vertically upright on the extendable frame section 105 when the extendable body section 107 is in its contracted position as shown in FIG.

10B. Here, the extendable frame section 105 is correspondingly in its retracted position, which is shown in FIG. 7B.

When the extendable body section 107 is in its extended position shown in FIG. 10A, the folding floor sections 155 and 156 are unfolded and lie horizontally flat along with the flat floor section 154 on the extendable frame section 105 as it is in its corresponding extended position shown in FIG. 7A. In this case, the bottom surfaces of the folding floor sections 155 and 156 are carried and supported by the rolling cantilever beams 128 and the telescoping cantilever joists 170 of the extendable frame sections 105. Conversely, when the extendable body section 107 is in its retracted position shown in FIG. 10B, the folding floor sections 155 and 156 are folded and sit vertically upward (i.e., upright) from the extendable frame section 105 as it is in its corresponding retracted position shown in FIG. 7B. Here, the bottom edges of the folding floor sections 155 and 156 are carried and supported by the rolling cantilever beams 128 and the telescoping cantilever joists 170 of the extendable frame sections 105. However, the flat floor section 154 continues to lie horizontally flat on the extendable frame section 105 in the manner described previously.

Referring again to FIGS. 9A to 9C, the perimeter portions 158 and 151 of the body sections 108 and 107 oppose each other and are aligned parallel to and on opposite sides of the longitudinal axis 109 and perpendicular to the lateral axis 110. This is the case because, as was described previously, the flat and foldable floor portions 157 and 150 of the extendable body sections 108 and 107 to which the perimeter portions 158 and 151 are securely fixed, carried by, and supported by also correspondingly oppose each other in the same manner. The perimeter portions 158 and 151 together form an expandable perimeter of the expandable body 104. More specifically, the perimeter portions 158 and 151 rise vertically from their corresponding flat and foldable floor portions 157 and 150 to form partial portions of the expandable perimeter of the expandable body 104.

In some embodiments, the perimeter portions 158 and 151 may comprise a plywood interior and a conventional wall exterior. In this case, the perimeter portions 158 and 151 may be fixed to the extendable frame sections 106 and 105 by screwing, bolting, gluing, and/or strapping them to the longitudinal fame beams 129 and 127, the rolling cantilever beams 130 and 128, and/or the telescoping cantilever joists 171 and 170 shown in FIGS. 5A and 5B.

As shown in FIGS. 10A and 10B, the perimeter portion 158 comprises corresponding endpoints 186 that define its partial portion of the expandable perimeter and its corresponding opening. Similarly, the perimeter portion 151 comprises corresponding endpoints 185 that define its partial portion of the expandable perimeter and its corresponding opening.

Figure 12A:
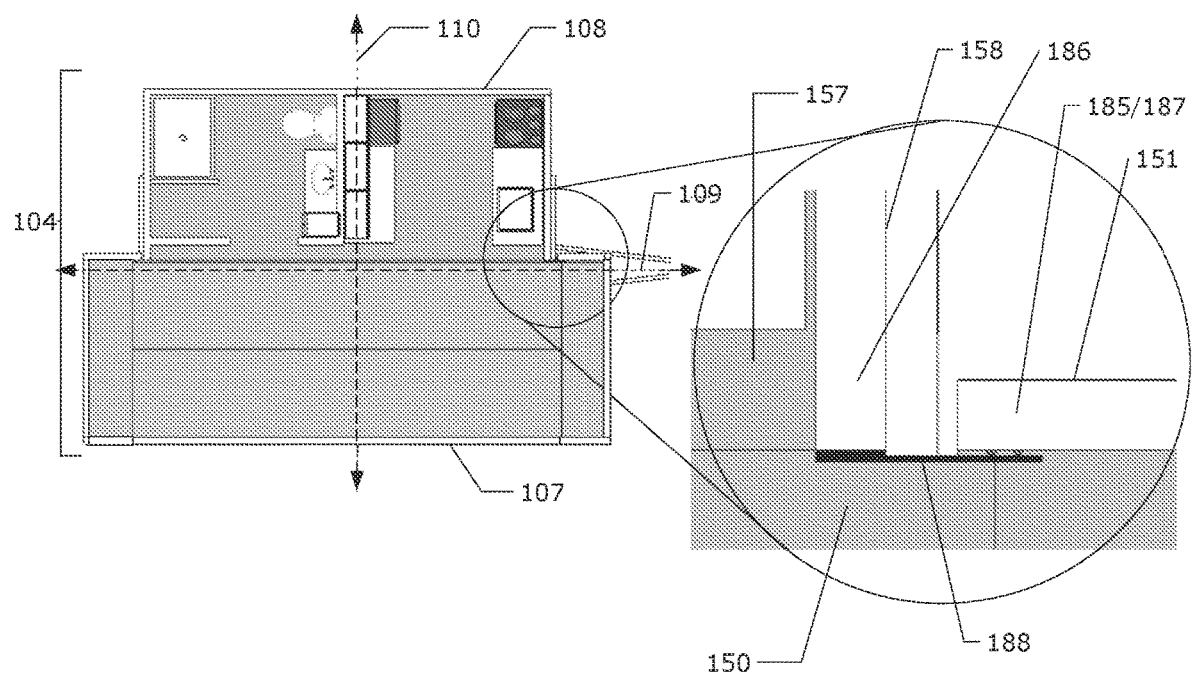
FIG. 12A shows a highlighted cross sectional top view of perimeter flanges of the expandable body for the expanded state of the expandable body.
Figure 12B:
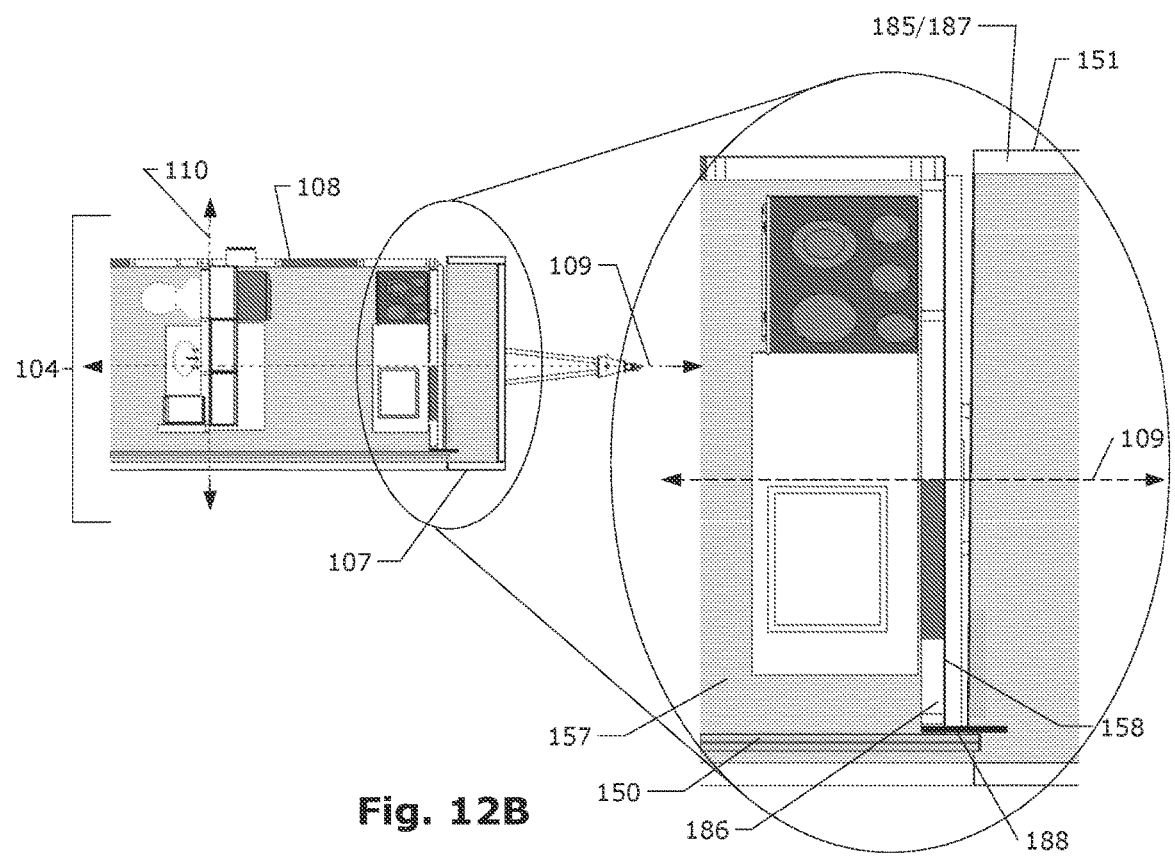
FIG. 12B shows a highlighted cross sectional top view of perimeter flanges of the expandable body for the contracted state of the expandable body.

And, as shown in FIGS. 12A and 12B, the expandable body 104 further comprises perimeter flanges 188 and 187 at corresponding endpoints 186 and 185 of the perimeter portions 158 and 151. The perimeter flanges 188 rise vertically from the flat floor portion 157 along the corresponding endpoints 186. Similarly, the perimeter flanges 187 rise vertically from the foldable floor portion 150 along the corresponding endpoints 185.

The perimeter flanges 188 and 187 of the perimeter portions 158 and 151 have latching and sealing surfaces that are aligned parallel to the longitudinal axis 109 and perpendicular to the lateral axis 110. The perimeter flanges 187 of the perimeter portion 151 are integrated with the perimeter portion 151 and form part of the endpoints 185 of the perimeter portion 158. The latching and sealing surfaces of the perimeter flanges 188 therefore extend a relatively small amount horizontally inward from the interior of the perimeter portion 151 but not passed its exterior. Conversely, the perimeter flanges 188 are separate from the perimeter portion 158 and are fixed to the endpoints 186 of the perimeter portion 158. Here, the latching and sealing surfaces of the perimeter flanges 188 extend a relatively large amount horizontally outward from the exterior of the perimeter portion 158.

Each perimeter flange 188 is aligned with an opposing and corresponding perimeter flange 187. In fact, the corresponding perimeter flanges 188 and 187 are aligned so that their latching and sealing surfaces opposingly meet each other from opposite directions parallel to the lateral axis 110 in order to latch and seal the corresponding endpoints 186 and 185 to each other. This results in the perimeter portions 158 and 151 being latched and sealed to each other.

The latching provided by the perimeter flanges 188 and 187 of the perimeter portions 158 and 151 additionally serves as a stop to prevent additional outward extension by the extendable body sections 108 and 107 and the corresponding extendable frame sections 106 and 105 to which they are fixed to, carried by, and supported by when they are extended.

In some embodiments, such as those shown in FIGS. 12A and 12B, the perimeter flanges 188 and 187 may comprise plywood and weather stripping. This makes the seal provided by flanges 188 and 187 weatherproof.

In some embodiments, the perimeter flanges 188 of the perimeter portion 158 could be integrated with the perimeter portion 158 and form part of the endpoints 186 in the same manner as described earlier for perimeter flanges 187. Alternatively, in other embodiments, the perimeter flanges 187 of the perimeter portion 151 could be separate from the perimeter portion 151 and be fixed to the endpoints 185 in the same manner as described earlier for perimeter flanges 188.

Referring again to FIGS. 9A to 9C, like the perimeter portions 158 and 151, the roof portions 159 and 152 of the extendable body sections 108 and 107 oppose each other and are aligned parallel to and on opposite sides of the longitudinal axis 109 and perpendicular to the lateral axis 110. This is due to the fact that they correspondingly are securely fixed to, carried by, and supported by the perimeter portions 158 and 151. Thus, the roof portions 159 and 152 together form an expandable roof of the expandable body 104.

In some embodiments, the roof portions 159 and 152 may comprise a plywood or wood plank interior and a conventional roof exterior. In this case, the roof portions 159 and 152 may be fixed to the extendable frame sections 106 and 105 by screwing, bolting, gluing, nailing, and/or strapping them to the perimeter portions 158 and 151

Furthermore, the roof portions 159 and 152, the perimeter portions 158 and 151, and the flat and foldable floor portions 157 and 150 of the expandable body sections 108 and 107 together define the interior volume of the extendable body 104. This is the case because the roof portions 159 and 152 together form the expandable roof of the expandable body 104, the perimeter portions 158 and 151 together form the expandable perimeter of the expandable body 104, and the flat and foldable floor portions 157 and 150 together form the expandable floor of the expandable body 104.

Figure 11A:
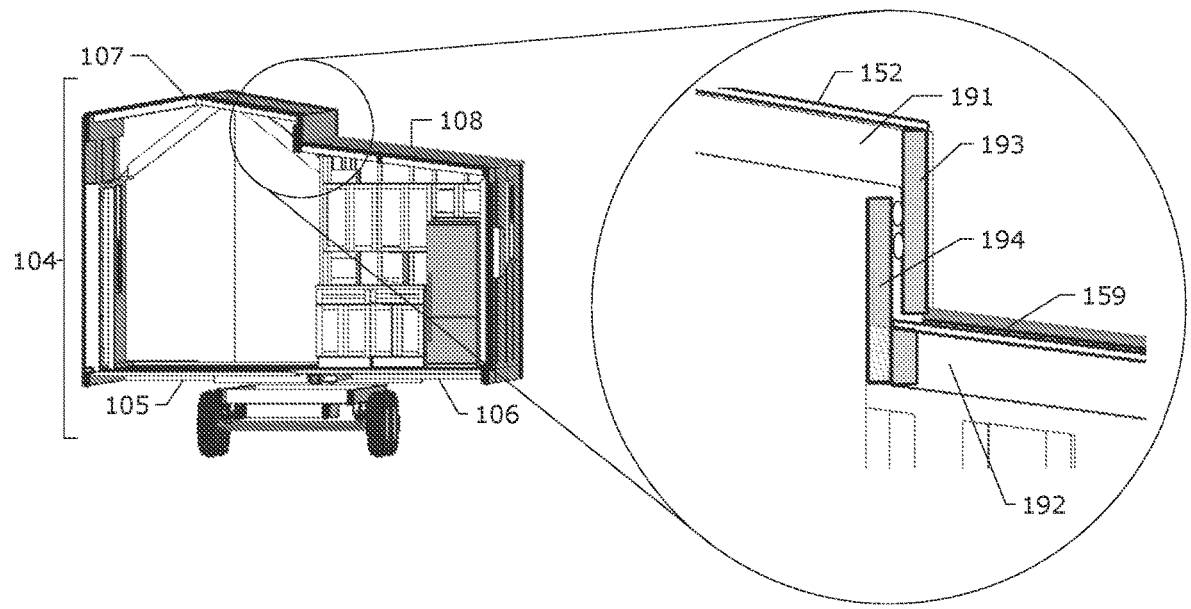
FIG. 11A shows a highlighted cross sectional perspective view of roof flanges of the expandable body for the expanded state of the expandable body.
Figure 11B:
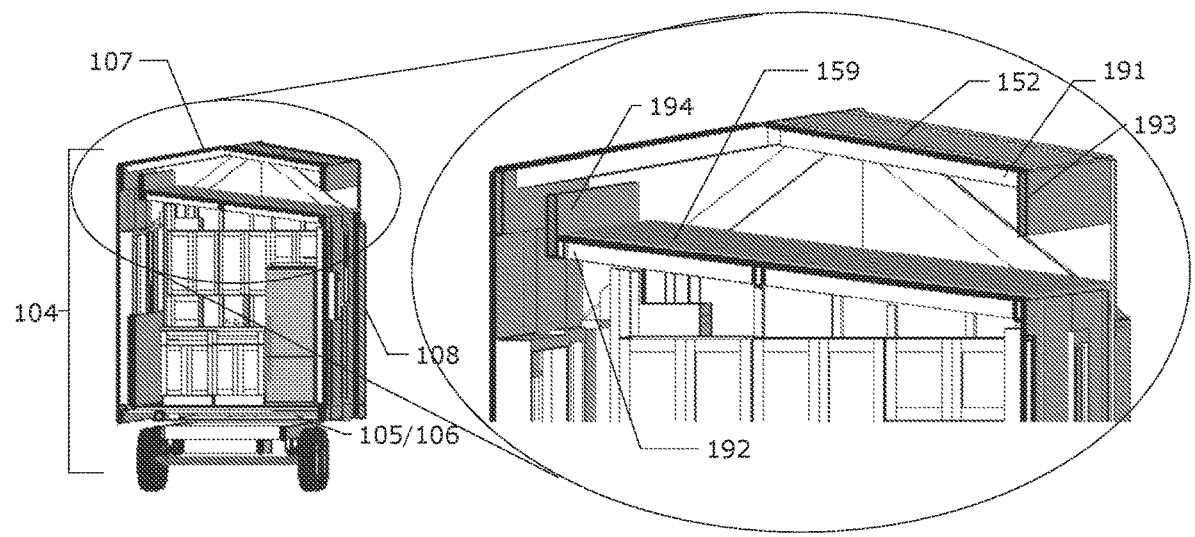
FIG. 11B shows a highlighted cross sectional perspective view of the roof flanges of the expandable body for the contracted state of the expandable body.

As shown in FIGS. 11A and 11B, the roof portion 159 comprises a corresponding endpoint 192 that define its partial portion of the expandable roof. Similarly, the perimeter portion 152 comprises a corresponding endpoint 191 that define its partial portion of the expandable roof.

As shown in FIGS. 11A and 11B, the expandable body 104 further comprises roof flanges 194 and 193 at corresponding endpoints 192 and 191 of the roof portions 159 and 152. The roof flange 194 runs horizontally along the corresponding endpoint 192 and joins with the perimeter flanges 188 of the perimeter portion 158, which are shown in FIGS. 12A and 12B, rising vertically upward from the flat floor portion 157. Similarly, the roof flange 193 runs horizontally along the corresponding endpoint 191 and joins with the perimeter flanges 187 of the perimeter portion 151, which are shown in FIGS. 12A and 12B, rising vertically upward from the foldable floor portion 150.

Like the perimeter flanges 188 and 187, the roof flanges 194 and 193 of the roof portions 159 and 152 have latching and sealing surfaces and are aligned parallel to the longitudinal axis 109 and perpendicular to the lateral axis 110. The roof flange 194 is separate from the roof portion 159 and is fixed to the endpoint 192 of the roof portion 159. Here, the latching and sealing surface of the roof flange 194 extends a relatively large amount vertically upward from the exterior of the roof portion 159. Similarly, the roof flange 193 is separate from the roof portion 152 and is fixed to the endpoint 191 of the roof portion 152. And, the latching and sealing surface of the roof flange 193 extends a relatively large amount vertically downward from the interior of the roof portion 152.

The roof flange 194 is aligned opposingly with the roof flange 193. In particular, the roof flanges 194 and 193 are aligned so that their latching and sealing surfaces opposingly meet each other from opposite directions parallel to the lateral axis 110 in order to latch and seal the corresponding endpoints 192 and 191 of the roof portions 159 and 152 to each other. This results in the roof portions 159 and 152 being latched and sealed to each other.

Moreover, as shown in FIGS. 11A and 11B and 12A and 12B, the latching provided by the roof flanges 194 and 193 of the roof portions 159 and 152 additionally serves as a stop to prevent additional outward extension by the extendable body sections 108 and 107 and the corresponding extendable frame sections 106 and 105 to which they are fixed to, carried by, and supported by when they are extended. In fact, this is done jointly with latching provided by the perimeter flanges 188 and 187 of the perimeter portions 158 and 152.

In some embodiments, the roof flanges 194 and 193 may comprise plywood and weather stripping. This makes the seal provided by flanges 194 and 193 weatherproof.

Furthermore, in some embodiments, the roof flange 194 could be integrated with the roof portion 159 and form part of the endpoint 192. Similarly, the roof flange 193 could be integrated with the roof portion 152 and form part of the endpoint 191.

Referring again to FIGS. 9A to 9C, as the extendable body sections 107 and 108 of the expandable body 104 are extended and retracted for the expanded and contracted states of the expandable body 104, the floor portions 150 and 157, perimeter portions 151 and 158, and the roof portions 152 and 159 are correspondingly extended and retracted. This occurs correspondingly when the frame sections 105 and 106 to which the extendable body sections 107 and 108 are fixed to, carried by and supported by are also extended and retracted for the expanded and contracted states of the expandable body 104. Moreover, the internal volume and/or area of the expandable body 104 defined by the floor portions 150 and 157, perimeter portions 151 and 158, and the roof portions 152 and 159 are correspondingly expanded and contracted.

FIG. 9A shows the extendable body sections 107 and 108 in their extended positions for the expanded states of the expandable body 104 and the expandable frame 103. Here, the extendable body sections 107 and 108 are opposingly, independently, and rollably extended out away from each other in the manner described earlier and correspondingly with the extendable frame sections 105 and 106 of the expandable frame 103. The foldable floor portion 157 of the extendable body section 107 is correspondingly unfolded and extended out away from the flat floor portion 150 of the extendable body section 108. And, the perimeter portions 151 and 158 of the extendable body section 107 are correspondingly extended out away from each other and latched and sealed by the perimeter flanges 187 and 188. Similarly, the roof portions 152 and 159 of the extendable body section 107 are correspondingly extended out away from each other and latched and sealed by the roof flanges 193 and 194.

Consequently, the interior area of the expandable body 104 that the foldable floor portion 157 and the flat floor portion 150 define is expanded. And, the interior volume of the expandable body 104 that the flat and foldable floor portions 150 and 157, the perimeter portions 151 and 158, and the roof portions 152 and 159 together define is likewise expanded.

In contrast, FIG. 9B shows the extendable body sections 107 and 108 in their retracted positions for the contracted states of the expandable body 104 and the expandable frame 103. In this case, the extendable body sections 107 and 108 are opposingly, independently, and rollably retracted in toward each other in the manner described earlier and correspondingly with the extendable frame sections 105 and 106 of the expandable frame 103. The foldable floor portion 157 of the extendable body section 107 is correspondingly folded and retracted in toward the flat floor portion 150 of the extendable body section 108. And, the perimeter portions 151 and 158 of the extendable body section 107 are correspondingly retracted in toward each other and no longer latched and sealed by the perimeter flanges 187 and 188. Similarly, the roof portions 152 and 159 of the extendable body section 107 are correspondingly retracted in toward each other and no longer latched and sealed by the roof flanges 193 and 194.

As a result, the interior area of the expandable body 104 that the foldable floor portion 157 and the flat floor portion 150 define is contracted. And, the interior volume of the expandable body 104 that the flat and foldable floor portions 150 and 157, the perimeter portions 151 and 158, and the roof portions 152 and 159 together define is likewise contracted.

FIG. 9C shows the extendable body sections 107 and 108 in their transition between the retracted and extended positions for the contracted and extended states of the expandable body 104 and the expandable frame 103. Here, the extendable body sections 107 and 108 are being opposingly, independently, and rollably retracted in toward or out away from each other in the manner described earlier and correspondingly with the extendable frame sections 105 and 106 of the expandable frame 103. The foldable floor portion 157 of the extendable body section 107 is correspondingly being folded and retracted in toward or unfolded and extended out away from the flat floor portion 150 of the extendable body section 108. And, the perimeter portions 151 and 158 of the extendable body section 107 are correspondingly retracted in toward or out away from each other. Similarly, the roof portions 152 and 159 of the extendable body section 107 are correspondingly retracted in toward or out away from each other.

In some embodiments, the expandable body section 107 may be substantially larger than the extendable body section 108, as shown in FIGS. 9A to 9C and 10A and 10B, in. This corresponds to the embodiments described earlier where the extendable frame section 105 of the expandable frame 103 is substantially larger than the extendable frame section 106 of the expandable frame 103 and therefore provides a substantially larger support area for the expandable body section 107, as shown in FIGS. 7A and 7B. In this case, the floor portion 157, the perimeter portion 158, and the roof portion 159 of the expandable body section 107 are substantially larger than the floor portion 150, the perimeter portion 151, and the roof portion 152 of the expandable body section 108. This correspondingly means that the interior volume and/or area the expandable body section 107 is substantially larger than that of the expandable body section 108.

In this case, the foldable floor portion 150 may further comprise flat floor sections 195 and 196, as shown in FIGS. 10A and 10B. The flat floor sections 195 and 196 would be lie horizontally flat on opposite sides of the flat floor section 154 and the foldable floor sections 155 and 156. Such flat floor sections 195 and 196 may be aligned so as to have horizontal widths aligned parallel to the longitudinal axis 109 and horizontal lengths parallel to the lateral axis 110. In addition, the flat floor sections 195 and 196 may be securely fixed to, carried by, and supported by the longitudinal frame beams 141 and 142 and/or the lateral frame beams 143 of the extendable frame section 105 shown in FIGS. 7A and 7B.

And, in some embodiments, the flat floor sections 195 and 196 may comprise plywood. In this case, the flat floor sections 195 and 196 may be fixed to the extendable frame section 105 by screwing, bolting, gluing, and/or strapping them to the longitudinal frame beams 141 and 142 and/or the lateral frame beams 143.

In some embodiments, the perimeter portions 158 and 157 may be walled, as is further shown in FIGS. 9A to 9C and 10A and 10B, and therefore comprises walls. The expandable body 104 in such embodiments may, for example, be an expandable living space body, expandable working space body, expandable cargo space body, or expandable storage space body. In fact, in the embodiments specifically shown in the 9A to 9C and 10A and 10B, the expandable body 104 is an expandable living space body for a tiny house trailer.

Furthermore, in some embodiments, the expandable body 104 may not include the roof portions 152 and 159. In this case, the expandable body 104 would be partially enclosed. As a result, the perimeter portions 151 and 158 and the flat and foldable floor portions 150 and 157 would together define an open or non-enclosed interior volume of the expandable body 104. The expandable body 104 in such embodiments may, for example, be an expandable cargo space body or expandable storage space body.

And, in other embodiments, the expandable body 104 may not include the roof portions 152 and 159 and the perimeter portions 151 and 158. As a result, the flat and foldable floor portions 150 and 157 would together form just the interior area of the expandable body 104 and also form an expandable floor, expandable platform, and/or expandable flatbed. The expandable body 104 in such embodiments may, for example, be an expandable flatbed body.

Referring again to FIGS. 3A and 3B and 5A and 5B, in some embodiments, the vehicle chassis 101 may be detachably fixed to the expandable frame 103 in the manner discussed earlier. In this case, when the vehicle chassis 101 is unbolted and detached from the expandable frame 103 when the expandable vehicle 100 is stationary and to be used for its stationary purpose and, the vehicle chassis 101 is also unbolted and detached from the expandable body 104. This may be done when the expandable frame 103 is in its expanded state and supported from below with jacks or other types of support structures, this means that the expandable body 104 is also in its expanded state and supported from below with such jacks or other types of support structures in this situation. And, when the vehicle chassis 101 is re-attached and re-bolted to the expandable frame 103 when the expandable vehicle 100 is to be moved, the vehicle chassis 101 is therefore re-attached and re-bolted to the expandable body 104.

Alternatively, in some embodiments, the vehicle chassis 101 may be permanently fixed to the expandable frame 103 by screwing, strapping, and/or welding it to the support foundation 111 of the vehicle chassis. Since the expandable body 104 comprises the expandable frame 103, the vehicle chassis 101 is permanently fixed to the expandable body 104 by being screwed, strapped, and/or welded to the support foundation 111 of the vehicle chassis 101. The vehicle chassis 101 is therefore always attached to the expandable frame 103 and the expandable body 104 as well regardless of whether the expandable vehicle 100 is stationary and being used for its stationary purpose or whether it is being moved.

Closing

The above detailed description of the invention is intended by way of example only. Although the invention is shown and described herein with reference to some example embodiments, it is nevertheless not intended to be limited to the details shown and described. Other embodiments and various structural and functional modifications may be contemplated without departing from the spirit and scope of the invention and within the scope and range of equivalents of the claims that follow.

What is claimed is:

1. An expandable trailer that comprises:
   a trailer chassis that defines a lateral axis and a longitudinal axis perpendicular to the lateral axis;
   an expandable structure that has an expanded state and a contracted state, the expandable structure comprises:
   an expandable frame that comprises:
      first anchor guide slots that are each fixed to the trailer chassis and oppose each other parallel to the lateral axis;
      a first extendable frame section that is aligned parallel to the longitudinal axis, the first extendable frame section comprises a first framing beam aligned parallel to the longitudinal axis and first cantilever beams that are each aligned parallel to the lateral axis and oppose each other parallel to the lateral axis, each of the first cantilever beams has a fixing end fixed to the first framing beam and an anchoring end rollably received and rollably anchored by a corresponding one of the first anchor guide slots, each of the first cantilever beams rolls out parallel to the lateral axis for the expanded state such that the first extendable frame section rolls out parallel to the lateral axis for the expanded state, each of the first cantilever beams rolls in parallel to the lateral axis for the contracted state such that the first extendable frame section rolls in parallel to the lateral axis for the contracted state;
      second anchor guide slots that are each fixed to the trailer chassis and oppose each other parallel to the lateral axis; and a second extendable frame section that is aligned parallel to the longitudinal axis, the second extendable frame section comprises a second framing beam aligned parallel to the longitudinal axis and second cantilever beams that are each aligned parallel to the lateral axis and oppose each other parallel to the lateral axis, each of the second cantilever beams has a fixing end fixed to the second framing beam and an anchoring end rollably received and rollably anchored by a corresponding one of the second anchor guide slots, each of the second cantilever beams rolls out parallel to the lateral axis for the expanded state such that the second extendable frame section rolls out parallel to the lateral axis for the expanded state, each of the second cantilever beams rolls in parallel to the lateral axis for the contracted state such that the second extendable frame section rolls in parallel to the lateral axis for the contracted state; and an expandable body comprising:
a first extendable body section that is aligned parallel to the longitudinal axis and fixed to and supported by the first extendable frame section such that it rolls out parallel to the lateral axis for the expanded state as the first extendable frame section rolls out parallel to the lateral axis for the expanded state and rolls in parallel to the lateral axis for the contracted state as the first extendable frame sections rolls in parallel to the lateral axis for the contracted state; and a second extendable body section that is aligned parallel to the longitudinal axis and fixed to and supported by the second extendable frame section such that it rolls out parallel to the lateral axis for the expanded state as the second extendable frame section rolls out parallel to the lateral axis for the expanded state and rolls in parallel to the lateral axis for the contracted state as the second extendable frame sections rolls in parallel to the lateral axis for the contracted state;

wherein the first and second extendable frame sections independently roll out away from each other in opposite directions parallel to the lateral axis for the expanded state such that the first and second extendable body sections independently roll out away from each other in opposite directions parallel to the lateral axis for the expanded state;

wherein the first and second extendable frame sections independently roll in toward each other in opposite directions parallel to the lateral axis for the contracted state such that the first and second extendable body sections independently roll in toward each other in opposite directions parallel to the lateral axis for the contracted state; and wherein the first and second extendable frame sections rollably intersect each other parallel to the lateral axis while opposing each other parallel to the longitudinal axis in both the expanded and contracted states such that the first and second extendable body sections rollably intersect each other parallel to the lateral axis while opposing each other parallel to the longitudinal axis in both the expanded and contracted states.

2. The expandable trailer of claim 1 wherein:
each of the first cantilever beams comprises guide wheels spaced apart along its anchoring end such that its anchoring end is rollably received and rollably anchored via the corresponding one of the first anchor guide slots; and each of the second cantilever beams comprises guide wheels spaced apart along its anchoring end such that its anchoring end is rollably received and rollably anchored via the corresponding one of the second anchor guide slots.

3. The expandable trailer of claim 2 wherein:
each of the first guide slots comprises a bottom surface, a top surface, a lower guide strip on its bottom surface, and an upper guide strip on its top surface;
each of the second guide slots comprises a bottom surface, a top surface, a lower guide strip on its bottom surface, and an upper guide strip on its top surface;
each of the guide wheels of each of the first cantilever beams comprises a groove that is aligned with the upper guide strip and lower guide strip of the corresponding one of the first guide slots so that the guide wheel is rollably guided through the corresponding one of the first guide slots; and
each of the guide wheels of each of the second cantilever beams comprises a groove that is aligned with the upper guide strip and lower guide strip of the corresponding one of the second guide slots so that the guide wheel is rollably guided through the corresponding one of the second guide slots.

4. The expandable trailer of claim 3 that further comprises:
a first anchor structure that is fixed to the trailer chassis, aligned parallel to the lateral axis, and comprises a corresponding one of the first anchor guide slots and a corresponding one of the second anchor guide slots;
a second anchor structure that is fixed to the trailer chassis, aligned parallel to the lateral axis, and comprises a corresponding one of the first anchor guide slots and a corresponding one of the second anchor guide slots; and
wherein the first and second anchor structures oppose each other parallel to the lateral axis.

5. The expandable trailer of claim 1 wherein:
the first extendable frame section further comprises first telescoping joists that are each aligned parallel to the lateral axis, each of the first telescoping joists has a fixing end fixed to the first framing beam and an intersecting end;
the second extendable frame section comprises second telescoping joists that are each aligned parallel to the lateral axis, each of the second telescoping joists has a fixing end fixed to the second framing beam and an intersecting end;
the intersecting end of each of the first telescoping joists is intersectingly and telescopingly received by the intersecting end of a corresponding one of the second telescoping joists;
each of the first telescoping joist telescopingly extends parallel to the lateral axis as the first extendable frame section rolls out parallel to the lateral axis for the expanded state, each of the first telescoping joist telescopingly retracts parallel to the lateral axis as the first extendable frame section rolls in parallel to the lateral axis for the contracted state; and
each of the second telescoping joist telescopingly extends parallel to the lateral axis as the second extendable frame section rolls out parallel to the lateral axis for the expanded state, each of the second telescoping joist telescopingly retracts parallel to the lateral axis as the second extendable frame section rolls in parallel to the lateral axis for the contracted state.

6. The expandable trailer of claim 5 wherein:
the second extendable frame section comprises a support beam aligned parallel to the longitudinal axis, the support beam comprises beam ends that are each fixed to a corresponding one of the second cantilever beams, each of the second telescoping joists is fixed to and supported by the beam; and
the support beam is rollably supported on the trailer chassis such that it rolls out on the trailer chassis parallel to the lateral axis as the second extendable frame section rolls out parallel to the lateral axis for the expanded state and rolls in on the trailer chassis parallel to the lateral axis as the second extendable frame section rolls in parallel to the lateral axis for the contracted state.

7. The expandable trailer of claim 6 wherein:
the trailer chassis comprises a lateral cross beam aligned parallel to the lateral axis; and
the second extendable frame section comprises a wheel assembly that is fixed to the support beam and comprises a wheel that rolls on the lateral cross beam such that the support beam is rollably supported on the trailer chassis.

8. The expandable trailer of claim 1 wherein:
the first and second extendable frame sections roll out away from each other parallel to the lateral axis from respective retracted positions for the contracted state to respective extended positions for the expanded state such that the first and second extendable body sections roll out away from each other parallel to the lateral axis from respective retracted positions for the contracted state to respective extended positions for the expanded state; and
the first and second extendable frame sections roll in toward each other parallel to the lateral axis from their respective extended positions for the expanded state to their respective retracted positions for the contracted state such that the first and second extendable body sections roll in toward each other parallel to the lateral axis from their respective extended positions for the expanded state to their respective retracted positions for the contracted state.

9. The expandable trailer of claim 8 wherein:
the first and second extendable frame sections intersect by a relatively large amount when they are in their respective retracted positions for the contracted state such that the first and second extendable body sections intersect by a relatively large amount when they are in their respective retracted positions for the contracted state; and
the first and second extendable frame sections intersect by a relatively small amount when they are in their respective extended positions for the expanded state such that the first and second extendable body sections intersect by a relatively small amount when they are in their respective extended positions for the expanded state.

10. The expandable trailer of claim 9 wherein:
the first extendable frame section has a support area;
the second extendable frame section has a support area;
the intersect of the first and second extendable frame sections by a relatively large amount comprises overlap of the support areas of the first and second extendable frame sections by a relatively large amount;
the intersect of the first and second extendable frame sections by a relatively small amount comprises overlap of the support areas of the first and second extendable frame sections by a relatively small amount;
the first extendable body section has an interior;
the second extendable body section has an exterior;
the intersect of the first and second extendable body sections by a relatively large amount comprises overlap of the exterior of the second extendable body section by the interior of the first extendable body section by a relatively large amount; and
the intersect of the first and second extendable body sections by a relatively small amount comprises overlap of the exterior of the second extendable body section by the interior of the first extendable body section by a relatively small amount.

11. The expandable trailer of claim 8 wherein:
the first extendable body section comprises first endpoints that define a first opening of the first extendable body section that is aligned parallel to the longitudinal axis;
the second extendable body section comprises second endpoints that define a second opening of the second extendable body section that is aligned parallel to the longitudinal axis;
the first extendable body section rollably receives the second extendable body section through the first opening such that the first and second extendable body sections rollably intersect via the first opening;
the first extendable body section comprises first flanges that run along the first endpoints and extend inward at the first opening;
the first extendable body section comprises second flanges that run along the second endpoints and extend outward at the second opening; and
the first and second flanges are squeezed together when the first and second extendable body sections are rolled out to their respective extended positions for the expanded state such that the first and second extendable body sections are stopped from being rolled out further.

12. The expandable trailer of claim 11 wherein:
the first extendable body section comprises a first perimeter portion that is fixed to, supported by, and rises vertically from the first extendable frame section;
the first endpoints comprise first perimeter endpoints of the first perimeter portion that rise vertically from the first extendable frame section along the first opening;
the first flanges comprise first vertical flanges that run vertically inward at the first opening along the first perimeter endpoints;
the second extendable body section comprises a second perimeter portion that is fixed to, supported by, and rises vertically from the second extendable frame section;
the second endpoints comprise second perimeter endpoints of the second perimeter portion that rise vertically from the second extendable frame section along the second opening; and
the second flanges comprise second vertical flanges that run vertically outward at the second opening along the second perimeter endpoints.

13. The expandable trailer of claim 12 wherein:
the first extendable body section comprises a first roof portion that is fixed to and supported by the first perimeter portion;
the first endpoints comprise a first roof endpoint of the first roof portion that extends horizontally above the first extendable frame section along the first opening;

the first flanges comprise a first horizontal flange that runs horizontally inward and downward along the first roof endpoints;

the second extendable body section comprises a second roof portion that is fixed to and supported by the second perimeter portion;

the second endpoints comprise a second roof endpoint of the second roof portion that extends horizontally above the second extendable frame section along the second opening; and the second flanges comprise a second horizontal flange that runs horizontally outward and upward along the second roof endpoints.

14. The expandable trailer of claim 11 wherein the first flanges are an integrated part of the first endpoints of the first extendable body section and the second flanges are fixed to the second endpoints of the second extendable body section.

15. The expandable trailer of claim 11 wherein the first and second flanges also form a seal between the first and second extendable body sections when squeezed together.

16. An expandable trailer that comprises:
a trailer chassis that defines a lateral axis and a longitudinal axis perpendicular to the lateral axis;
an expandable frame that has an expanded state and a contracted state, the expandable frame comprises:
first anchor guide slots that are each fixed to the trailer chassis and oppose each other parallel to the lateral axis;
a first extendable frame section that is aligned parallel to the longitudinal axis, the first extendable frame section comprises a first framing beam aligned parallel to the longitudinal axis and first cantilever beams that are each aligned parallel to the lateral axis and oppose each other parallel to the lateral axis, each of the first cantilever beams has a fixing end fixed to the first framing beam and an anchoring end rollably received and rollably anchored by a corresponding one of the first anchor guide slots, each of the first cantilever beams rolls out parallel to the lateral axis for the expanded state such that the first extendable frame section rolls out parallel to the lateral axis for the expanded state, each of the first cantilever beams rolls in parallel to the lateral axis for the contracted state such that the first extendable frame section rolls in parallel to the lateral axis for the contracted state;
second anchor guide slots that are each fixed to the trailer chassis and oppose each other parallel to the lateral axis; and
a second extendable frame section that is aligned parallel to the longitudinal axis, the second extendable frame section comprises a second framing beam aligned parallel to the longitudinal axis and second cantilever beams that are each aligned parallel to the lateral axis and oppose each other parallel to the lateral axis, each of the second cantilever beams has a fixing end fixed to the second framing beam and an anchoring end rollably received and rollably anchored by a corresponding one of the second anchor guide slots, each of the second cantilever beams rolls out parallel to the lateral axis for the expanded state such that the second extendable frame section rolls out parallel to the lateral axis for the expanded state, each of the second cantilever beams rolls in parallel to the lateral axis for the contracted state such that the second extendable frame section rolls in parallel to the lateral axis for the contracted state;

wherein the first and second extendable frame sections independently roll out away from each other in opposite directions parallel to the lateral axis for the expanded state;

wherein the first and second extendable frame sections independently roll in toward each other in opposite directions parallel to the lateral axis for the contracted state; and wherein the first and second extendable frame sections rollably intersect each other parallel to the lateral axis while opposing each other parallel to the longitudinal axis in both the expanded and contracted states.

17. The expandable trailer of claim 16 wherein:
each of the first cantilever beams comprises guide wheels spaced apart along its anchored end such that its anchored end is rollably received and rollably anchored via the corresponding one of the first anchor guide slots; and
each of the second cantilever beams comprises guide wheels spaced apart along its anchored end such that its anchored end is rollably received and rollably anchored via the corresponding one of the second anchor guide slots.

18. The expandable trailer of claim 17 wherein:
each of the first guide slots comprises a bottom surface, a top surface, a lower guide strip on its bottom surface, and an upper guide strip on its top surface;
each of the second guide slots comprises a bottom surface, a top surface, a lower guide strip on its bottom surface, and an upper guide strip on its top surface;
each of the guide wheels of each of the first cantilever beams comprises a groove that is aligned with the upper guide strip and lower guide strip of the corresponding one of the first guide slots so that the guide wheel is rollably guided through the corresponding one of the first guide slots; and
each of the guide wheels of each of the second cantilever beams comprises a groove that is aligned with the upper guide strip and lower guide strip of the corresponding one of the second guide slots so that the guide wheel is rollably guided through the corresponding one of the second guide slots.

19. The expandable trailer of claim 18 that further comprises:
a first anchor structure that is fixed to the trailer chassis, aligned parallel to the lateral axis, and comprises a corresponding one of the first anchor guide slots and a corresponding one of the second anchor guide slots;
a second anchor structure that is fixed to the trailer chassis, aligned parallel to the lateral axis, and comprises a corresponding one of the first anchor guide slots and a corresponding one of the second anchor guide slots; and
wherein the first and second anchor structures oppose each other parallel to the lateral axis.

20. The expandable trailer of claim 16 wherein:
the first extendable frame section further comprises first telescoping joists that are each aligned parallel to the lateral axis, each of the first telescoping joists has a fixing end fixed to the first framing beam and an intersecting end;
the second extendable frame section comprises second telescoping joists that are each aligned parallel to the lateral axis, each of the second telescoping joists has a fixing end fixed to the second framing beam and an intersecting end;

the intersecting end of each of the first telescoping joists is intersectingly and telescopingly received by the intersecting end of a corresponding one of the second telescoping joists;

each of the first telescoping joist telescopingly extends parallel to the lateral axis as the first extendable frame section rolls out parallel to the lateral axis for the expanded state, each of the first telescoping joist telescopingly retracts parallel to the lateral axis as the first extendable frame section rolls in parallel to the lateral axis for the contracted state; and each of the second telescoping joist telescopingly extends parallel to the lateral axis as the second extendable frame section rolls out parallel to the lateral axis for the expanded state, each of the second telescoping joist telescopingly retracts parallel to the lateral axis as the second extendable frame section rolls in parallel to the lateral axis for the contracted state.

21. The expandable trailer of claim 20 wherein:

the second extendable frame section comprises a support beam aligned parallel to the longitudinal axis, the support beam comprises beam ends that are each fixed to a corresponding one of the second cantilever beams, each of the second telescoping joists is fixed to and supported by the beam; and the support beam is rollably supported on the trailer chassis such that it rolls out on the trailer chassis parallel to the lateral axis as the second extendable frame section rolls out parallel to the lateral axis for the expanded state and rolls in on the trailer chassis parallel to the lateral axis as the second extendable frame section rolls in parallel to the lateral axis for the contracted state.

22. The expandable trailer of claim 21 wherein:

the trailer chassis comprises a lateral cross beam aligned parallel to the lateral axis; and the second extendable frame section comprises a wheel assembly that is fixed to the support beam and comprises a wheel that rolls on the lateral cross beam such that the support beam is rollably supported on the trailer chassis.

23. The expandable trailer of claim 16 wherein:

the first and second extendable frame sections roll out away from each other parallel to the lateral axis from respective retracted positions for the contracted state to respective extended positions for the expanded state; and the first and second extendable frame sections roll in toward each other parallel to the lateral axis from their respective extended positions for the expanded state to their respective retracted positions for the contracted state.

24. The expandable trailer of claim 23 wherein:

the first and second extendable frame sections intersect by a relatively large amount when they are in their respective retracted positions for the contracted state; and the first and second extendable frame sections intersect by a relatively small amount when they are in their respective extended positions for the expanded state.

25. The expandable trailer of claim 24 wherein:

the first extendable frame section has a support area;

the second extendable frame section has a support area;

the intersect of the first and second extendable frame sections by a relatively large amount comprises overlap of the support areas of the first and second extendable frame sections by a relatively large amount; and the intersect of the first and second extendable frame sections by a relatively small amount comprises overlap of the support areas of the first and second extendable frame sections by a relatively small amount.

26. An expandable frame for an expandable trailer, the expandable trailer comprises a trailer chassis that defines a lateral axis and a longitudinal axis perpendicular to the lateral axis, the expandable frame has an expanded state and a contracted state and comprises:

first anchor guide slots that are each configured to be fixed to the trailer chassis and oppose each other parallel to the lateral axis;

a first extendable frame section that is aligned parallel to the longitudinal axis, the first extendable frame section comprises a first framing beam aligned parallel to the longitudinal axis and first cantilever beams that are each aligned parallel to the lateral axis and oppose each other parallel to the lateral axis, each of the first cantilever beams has a fixing end fixed to the first framing beam and an anchoring end rollably received and rollably anchored by a corresponding one of the first anchor guide slots, each of the first cantilever beams rolls out parallel to the lateral axis for the expanded state such that the first extendable frame section rolls out parallel to the lateral axis for the expanded state, each of the first cantilever beams rolls in parallel to the lateral axis for the contracted state such that the first extendable frame section rolls in parallel to the lateral axis for the contracted state;

second anchor guide slots that are each configured to be fixed to the trailer chassis and oppose each other parallel to the lateral axis; and a second extendable frame section that is aligned parallel to the longitudinal axis, the second extendable frame section comprises a second framing beam aligned parallel to the longitudinal axis and second cantilever beams that are each aligned parallel to the lateral axis and oppose each other parallel to the lateral axis, each of the second cantilever beams has a fixing end fixed to the second framing beam and an anchoring end rollably received and rollably anchored by a corresponding one of the second anchor guide slots, each of the second cantilever beams rolls out parallel to the lateral axis for the expanded state such that the second extendable frame section rolls out parallel to the lateral axis for the expanded state, each of the second cantilever beams rolls in parallel to the lateral axis for the contracted state such that the second extendable frame section rolls in parallel to the lateral axis for the contracted state;

wherein the first and second extendable frame sections independently roll out away from each other in opposite directions parallel to the lateral axis for the expanded state;

wherein the first and second extendable frame sections independently roll in toward each other in opposite directions parallel to the lateral axis for the contracted state; and wherein the first and second extendable frame sections rollably intersect each other parallel to the lateral axis while opposing each other parallel to the longitudinal axis in both the expanded and contracted states.

27. The expandable frame of claim 26 wherein:

each of the first cantilever beams comprises guide wheels spaced apart along its anchored end such that its anchored end is rollably received and rollably anchored via the corresponding one of the first anchor guide slots; and each of the second cantilever beams comprises guide wheels spaced apart along its anchored end such that its anchored end is rollably received and rollably anchored via the corresponding one of the second anchor guide slots.

28. The expandable frame of claim 27 wherein:

each of the first guide slots comprises a bottom surface, a top surface, a lower guide strip on its bottom surface, and an upper guide strip on its top surface;

each of the second guide slots comprises a bottom surface, a top surface, a lower guide strip on its bottom surface, and an upper guide strip on its top surface;

each of the guide wheels of each of the first cantilever beams comprises a groove that is aligned with the upper guide strip and lower guide strip of the corresponding one of the first guide slots so that the guide wheel is rollably guided through the corresponding one of the first guide slots; and each of the guide wheels of each of the second cantilever beams comprises a groove that is aligned with the upper guide strip and lower guide strip of the corresponding one of the second guide slots so that the guide wheel is rollably guided through the corresponding one of the second guide slots.

29. The expandable frame of claim 28 that further comprises:

a first anchor structure that is configured to be fixed to the trailer chassis, aligned parallel to the lateral axis, and comprises a corresponding one of the first anchor guide slots and a corresponding one of the second anchor guide slots; and a second anchor structure that is configured to be fixed to the trailer chassis, aligned parallel to the lateral axis, and comprises a corresponding one of the first anchor guide slots and a corresponding one of the second anchor guide slots;

wherein the first and second anchor structures oppose each other parallel to the lateral axis.

30. The expandable frame of claim 26 wherein:

the first extendable frame section further comprises first telescoping joists that are each aligned parallel to the lateral axis, each of the first telescoping joists has a fixing end fixed to the first framing beam and an intersecting end;

the second extendable frame section comprises second telescoping joists that are each aligned parallel to the lateral axis, each of the second telescoping joists has a fixing end fixed to the second framing beam and an intersecting end;

the intersecting end of each of the first telescoping joists is intersectingly and telescopingly received by the intersecting end of a corresponding one of the second telescoping joists;

each of the first telescoping joist telescopingly extends parallel to the lateral axis as the first extendable frame section rolls out parallel to the lateral axis for the expanded state, each of the first telescoping joist telescopingly retracts parallel to the lateral axis as the first extendable frame section rolls in parallel to the lateral axis for the contracted state; and each of the second telescoping joist telescopingly extends parallel to the lateral axis as the second extendable frame section rolls out parallel to the lateral axis for the expanded state, each of the second telescoping joist telescopingly retracts parallel to the lateral axis as the second extendable frame section rolls in parallel to the lateral axis for the contracted state.

31. The expandable frame of claim 30 wherein:

the second extendable frame section comprises a support beam aligned parallel to the longitudinal axis, the support beam comprises beam ends that are each fixed to a corresponding one of the second cantilever beams, each of the second telescoping joists is fixed to and supported by the beam; and the support beam is configured to be rollably supported on the trailer chassis such that it rolls out on the trailer chassis parallel to the lateral axis as the second extendable frame section rolls out parallel to the lateral axis for the expanded state and rolls in on the trailer chassis parallel to the lateral axis as the second extendable frame section rolls in parallel to the lateral axis for the contracted state.

32. The expandable frame of claim 31 wherein:

the trailer chassis comprises a lateral cross beam aligned parallel to the lateral axis; and the second extendable frame section comprises a wheel assembly that is fixed to the support beam, and comprises a wheel configured to roll on the lateral cross beam such that the support beam is rollably supported on the trailer chassis.

33. The expandable frame of claim 26 wherein:

the first and second extendable frame sections roll out away from each other parallel to the lateral axis from respective retracted positions for the contracted state to respective extended positions for the expanded state; and the first and second extendable frame sections roll in toward each other parallel to the lateral axis from their respective extended positions for the expanded state to their respective retracted positions for the contracted state.

34. The expandable frame of claim 33 wherein:

the first and second extendable frame sections intersect by a relatively large amount when they are in their respective retracted positions for the contracted state; and the first and second extendable frame sections intersect by a relatively small amount when they are in their respective extended positions for the expanded state.

35. The expandable frame of claim 34 wherein:

the first extendable frame section has a support area;

the second extendable frame section has a support area;

the intersect of the first and second extendable frame sections by a relatively large amount comprises overlap of the support areas of the first and second extendable frame sections by a relatively large amount; and the intersect of the first and second extendable frame sections by a relatively small amount comprises overlap of the support areas of the first and second extendable frame sections by a relatively small amount.

36. The expandable trailer of claim 4 wherein:

the first anchor structure comprises an H beam that has opposite sides and comprises on its opposite sides the corresponding one of the first anchor guide slots of the first anchor structure and the corresponding one of the second anchor guide slots of the first anchor structure; and the second anchor structure comprises an H beam that has opposite sides and comprises on its opposite sides the corresponding one of the first anchor guide slots of the second anchor structure and the corresponding one of the second anchor guide slots of the second anchor structure.

37. The expandable trailer of claim 1 wherein the first and second anchor guide slots overlap parallel to the lateral axis such that the first and the second extendable frame sections rollably intersect each other parallel to the lateral axis while opposing each other parallel to the longitudinal axis in both the expanded and contracted states as the first and the second cantilever beams roll out and roll in for the expanded and contracted states.

38. The expandable trailer of claim 19 wherein:
the first anchor structure comprises an H beam that has opposite sides and comprises on its opposite sides the corresponding one of the first anchor guide slots of the first anchor structure and the corresponding one of the second anchor guide slots of the first anchor structure; and
the second anchor structure comprises an H beam that has opposite sides and comprises on its opposite sides the corresponding one of the first anchor guide slots of the second anchor structure and the corresponding one of the second anchor guide slots of the second anchor structure.

39. The expandable trailer of claim 16 wherein the first and second anchor guide slots overlap parallel to the lateral axis such that the first and the second extendable frame sections rollably intersect each other parallel to the lateral axis while opposing each other parallel to the longitudinal axis in both the expanded and contracted states as the first and the second cantilever beams roll out and roll in for the expanded and contracted states.

40. The expandable frame of claim 29 wherein:
the first anchor structure comprises an H beam that has opposite sides and comprises on its opposite sides the corresponding one of the first anchor guide slots of the first anchor structure and the corresponding one of the second anchor guide slots of the first anchor structure; and
the second anchor structure comprises an H beam that has opposite sides and comprises on its opposite sides the corresponding one of the first anchor guide slots of the second anchor structure and the corresponding one of the second anchor guide slots of the second anchor structure.

41. The expandable frame of claim 26 wherein the first and second anchor guide slots overlap parallel to the lateral axis such that the first and the second extendable frame sections rollably intersect each other parallel to the lateral axis while opposing each other parallel to the longitudinal axis in both the expanded and contracted states as the first and the second cantilever beams roll out and roll in for the expanded and contracted states.

* * * * *